(12) United States Patent
Tsuyama

(10) Patent No.: US 7,334,906 B2
(45) Date of Patent: Feb. 26, 2008

(54) OUTER MIRROR TILTING APPARATUS

(75) Inventor: Osamu Tsuyama, Isehara (JP)

(73) Assignee: Ichikoh Industries, Ltd., Tokyo (JP)

( * ) Notice: Subject to any disclaimer, the term of this patent is extended or adjusted under 35 U.S.C. 154(b) by 0 days.

(21) Appl. No.: 10/883,046

(22) Filed: Jul. 2, 2004

(65) Prior Publication Data

US 2005/0030655 A1 Feb. 10, 2005

(30) Foreign Application Priority Data

| Jul. 10, 2003 | (JP) | 2003-194987 |
| Jul. 10, 2003 | (JP) | 2003-194988 |
| Jul. 10, 2003 | (JP) | 2003-194989 |
| Jul. 10, 2003 | (JP) | 2003-194990 |

(51) Int. Cl.
*G02B 5/08* (2006.01)
*B60R 1/072* (2006.01)
(52) U.S. Cl. ..................... 359/874; 248/487
(58) Field of Classification Search ............. 359/877, 359/871–873, 843, 848, 874; 248/476, 487
See application file for complete search history.

(56) References Cited

U.S. PATENT DOCUMENTS

| 4,678,295 A | 7/1987 | Fisher |
| 4,915,493 A | 4/1990 | Fisher et al. |
| 5,007,725 A * | 4/1991 | Manzoni ................ 359/873 |
| 5,226,034 A * | 7/1993 | Nagayama et al. ......... 359/873 |
| 5,986,364 A | 11/1999 | Bingle et al. |
| 5,993,018 A * | 11/1999 | Hattori et al. ............. 359/877 |
| 6,058,553 A * | 5/2000 | Tsuyama et al. ....... 15/250.003 |
| 6,094,027 A * | 7/2000 | Willmore et al. .......... 318/652 |
| 6,174,062 B1 | 1/2001 | Schillegger et al. |
| 6,478,436 B1 * | 11/2002 | Jacobsen ................... 359/877 |

FOREIGN PATENT DOCUMENTS

| EP | 1 084 906 A2 | 3/2001 |
| JP | 2002-67795 A | 3/2002 |
| WO | WO 02/101425 A2 | 12/2002 |

* cited by examiner

*Primary Examiner*—Alessandro Amari
*Assistant Examiner*—Mark Consilvio
(74) *Attorney, Agent, or Firm*—Foley & Lardner LLP

(57) ABSTRACT

An outer-mirror tilting apparatus includes a holder base that fixes a main body of an outer mirror, a housing that is fitted to a bearing unit of the holder base, the housing having a pivot shaft supporting the holder base in a tiltable manner, a rod driving mechanism that includes a pair of driving rods and a driving unit, and a rod detecting mechanism that includes a pair of detecting rods and a detector.

2 Claims, 19 Drawing Sheets

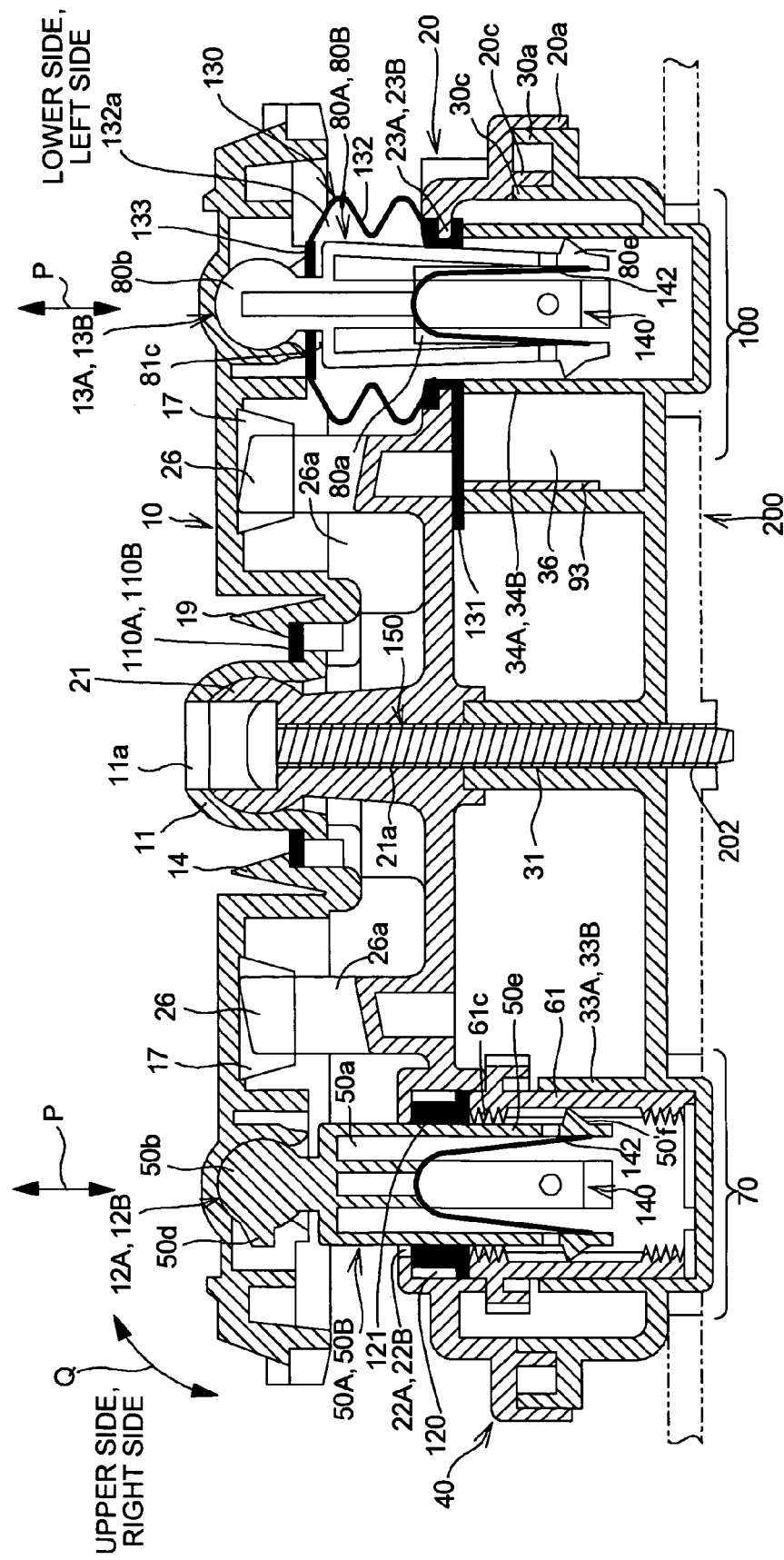

OUTER MIRROR TILTING APPARATUS

CROSS-REFERENCE TO RELATED APPLICATIONS

The present document incorporates by reference the entire contents of Japanese priority documents, 2003-194987 filed in Japan on Jul. 10, 2003, 2003-194988 filed in Japan on Jul. 10, 2003, 2003-194989 filed in Japan on Jul. 10, 2003 and 2003-194990 filed in Japan on Jul. 10, 2003.

BACKGROUND OF THE INVENTION

1) Field of the Invention

The present invention relates to an outer-mirror tilting apparatus that tilts a main body of an outer mirror, and more particularly, to an outer-mirror tilting apparatus integrated with a rod driving mechanism that tilts the main body and a rod detecting mechanism that detects a tilting angle of the main body.

2) Description of the Related Art

Conventionally, as an outer mirror to be mounted on a vehicle body of an automobile such as a passenger vehicle, there is one mounted with an outer-mirror tilting apparatus that can adjust a visual field of a main body relative to an outer mirror base from an interior of the vehicle, namely, can tilt the main body. For example, the outer-mirror tilting apparatus is constituted such that a pivot shaft formed in a housing is fitted into a bearing unit formed at a central portion of a holder base to which the main body is fixed so that the holder base is supported to the housing so as to freely tilt relative thereto. In the outer-mirror tilting apparatus, a distal end of a driving rod of a rod driving mechanism is fitted into a driving socket of the holder base. Thereby, the outer-mirror tilting apparatus causes the driving rod to project from/retract into the housing by driving a driving unit of the rod driving mechanism to tilt the main body fixed to the holder base about the bearing unit of the holder base.

The visual field of the main body varies according to a difference in physical constitution of a driver on a vehicle when its tilting angle is constant. Accordingly, when a driver with a different physical constitution drives a vehicle, it is necessary to adjust the visual field of the main body. When the vehicle moves backward, the driver may wish to change the visual field of the main body. In these cases, the driver drives the outer-mirror tilting apparatus from the interior of the vehicle to change the tilting angle of the main body. In view of these circumstances, there is a demand to detect the tilting angle of the main body. Conventionally, there is proposed a technique for fixing, on the outer mirror base or the outer-mirror tilting apparatus, an outer mirror detector that detects a tilting angle of a mirror fixed to the holder base separately of the outer-mirror tilting apparatus.

However, the outer mirror detector is separately fixed to the outer-mirror tilting apparatus independent of the outer-mirror tilting apparatus. Accordingly, since the number of parts constituting the outer mirror that can detect the tilting angle of the main body increases, such a problem as increase in the number of assembling steps or increase in manufacturing cost occurs.

SUMMARY OF THE INVENTION

It is an object of the present invention to solve at least the above problems in the conventional technology.

The outer-mirror tilting apparatus according to one aspect of the present invention includes a holder base that fixes a main body of an outer mirror; a housing that is fitted to a bearing unit of the holder base, the housing having a pivot shaft supporting the holder base in a tiltable manner; a rod driving mechanism that includes a pair of driving rods whose distal ends are fitted to a first driving socket and a second driving socket provided on the holder base to tilt the holder base in vertical direction and in horizontal direction, respectively, and a driving unit that projects/retracts each of the pair of driving rods from/into the housing; and a rod detecting mechanism that includes a pair of detecting rods disposed so as to be opposed to the pair of driving rods through the pivot shaft and project from/retract into the housing corresponding to tilting of the holder base in the vertical direction and in the horizontal direction, respectively, and a detector that detects the tilting angle of the holder base based on projecting/retracting amounts of the pair of detecting rods.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 19 is a sectional view taken along line 0-0 in FIG. 17.

DETAILED DESCRIPTION

Exemplary embodiments of an outer-mirror tilting apparatus according to the present invention will be explained in detail with reference to the accompanying drawings. The present invention is not limited by the embodiment.

Figure 1:
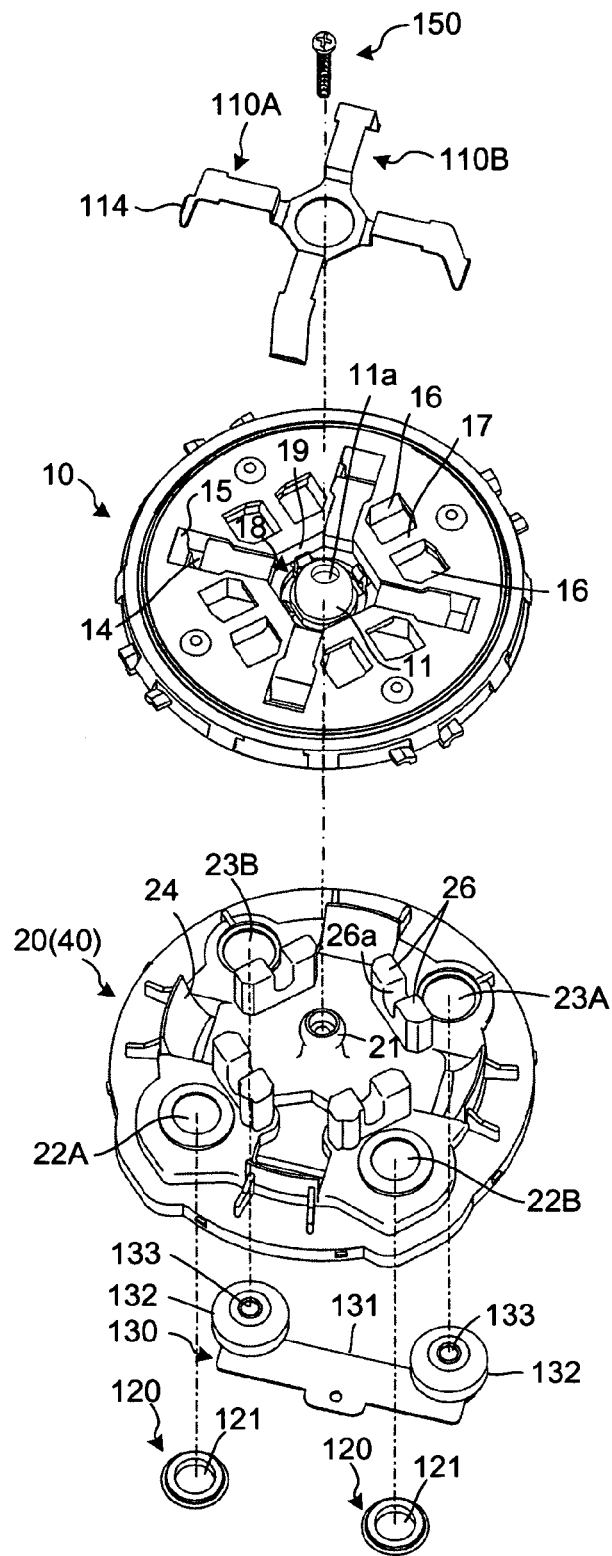
FIG. 1 is an exploded perspective view of an outer-mirror tilting apparatus according to the present invention.
Figure 2:
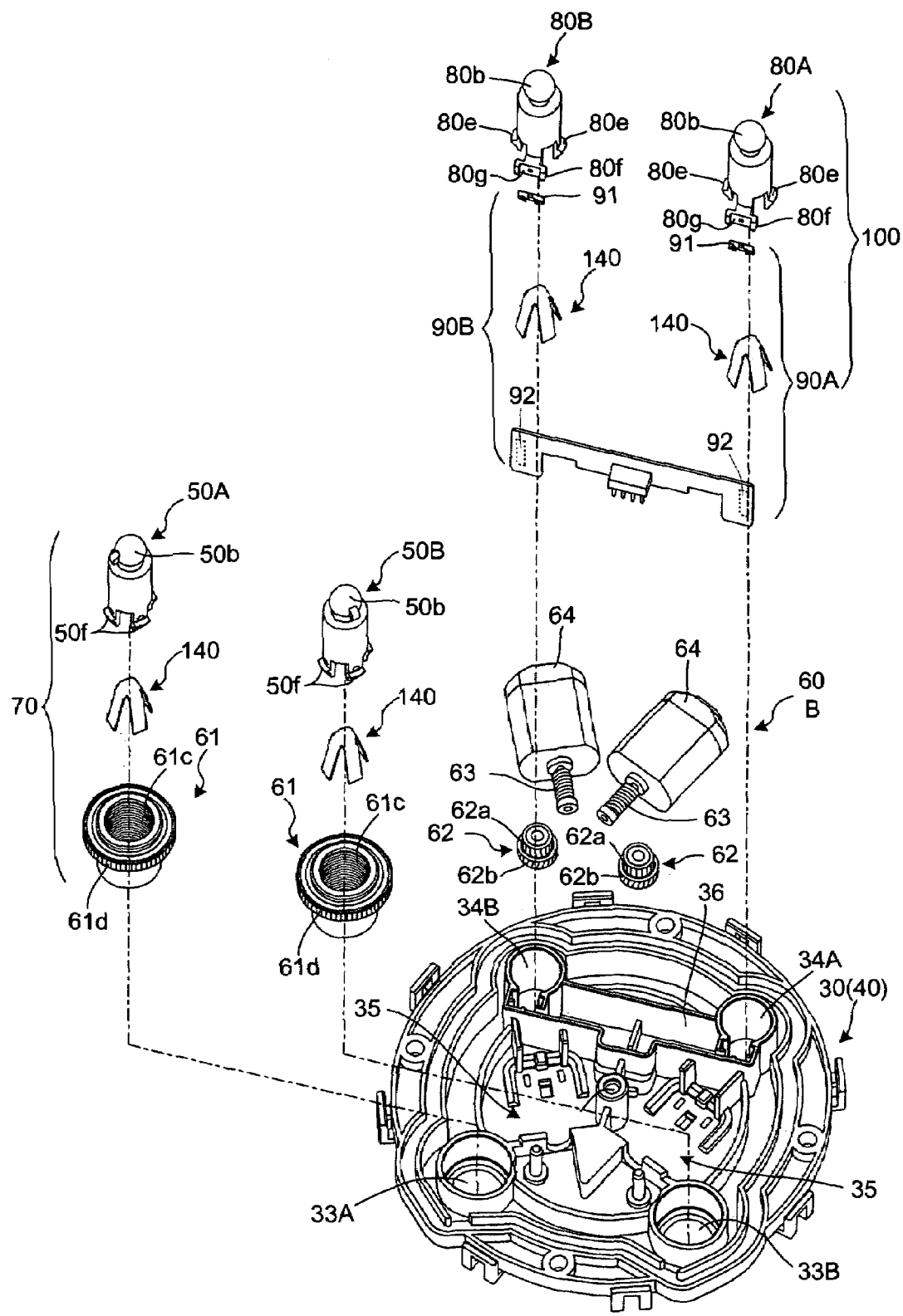
FIG. 2 is an exploded perspective view of the outer-mirror tilting apparatus according to the present invention.

FIGS. 1 and 2 are exploded perspective views of an outer-mirror tilting apparatus according to the present invention. As shown in FIGS. 1 and 2, an outer-mirror tilting apparatus 1 is constituted of a holder base 10 which fixes a main body, a housing 40 provided with a housing lid 20 and a housing body 30, a rod driving mechanism 70, and a rod detecting mechanism 100. The rod driving mechanism 70 is constituted of a pair of driving rods 50A, 50B, and a pair of driving units 60A and 60B. The rod detecting mechanism 100 is constituted of a pair of detecting rods 80A and 80B, and a pair of detectors 90A and 90B.

Figure 3A:
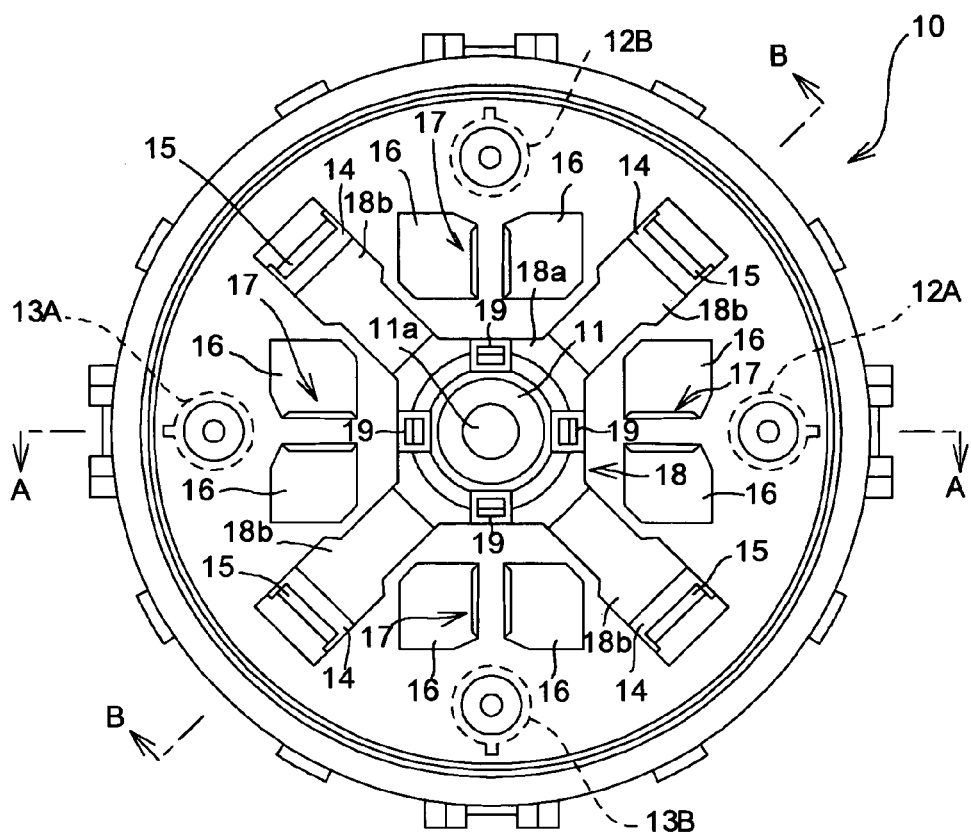
FIG. 3A is a plan view of a holder base.
Figure 3B:
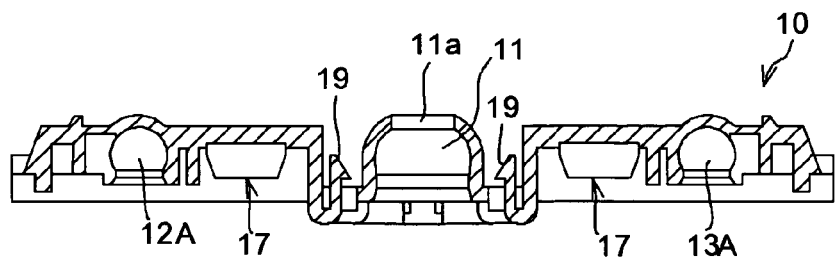
FIG. 3B is a sectional view taken along line A-A in FIG. 3A.
Figure 3C:
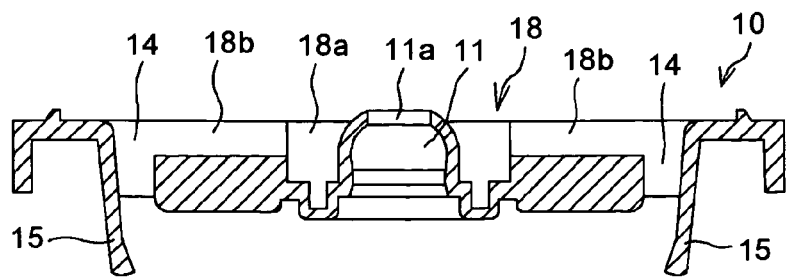
FIG. 3C is a sectional view taken along line B-B in FIG. 3A.

FIGS. 3A to 3C are constitutional examples of a holder base. The holder base 10 has a circular plate shape made of synthetic resin and the like, as shown in FIGS. 1 and 3. A bearing unit 11 into which a pivot shaft 21 formed on the housing lid 20 of the housing 40 described later is fitted is formed at a central portion of a back face of the holder base 10. The bearing unit 11 has a spherical inner face corresponding to the pivot shaft 21 and its root portion is opened with a diameter smaller than the maximum diameter of the pivot shaft 21. The bearing unit 11 is formed with a bearing unit opening 11a extending up to a surface of the holder base 10 in a communicating manner at a position thereof opposed to a housing lid communication hole 21a formed in the housing lid 20 of the housing 40, as described later.

A pair of driving sockets 12A and 12B, and a pair of detecting sockets 13A and 13B are formed in an annular manner near an outer peripheral edge of the back face of the holder base 10. Here, the respective sockets (12A, 12B, 13A, and 13B) are formed on an outer periphery of the bearing unit 11 at intervals of 90°. The respective sockets (12A, 12B, 13A, and 13B) have the same shape. The pair of driving sockets 12A and 12B have spherical inner faces corresponding to ones of the pair of driving rods 50A, 50B, respectively, and their root portions are opened with diameters smaller than the maximum diameters of the pair of driving rods 50A, 50B. Further, the pair of detecting sockets 13A and 13B have spherical inner faces corresponding to ones of the pair of detecting rods 80A and 80B, respectively, and their root portions are opened with diameters smaller than the maximum diameters of the pair of detecting rods 80A and 80B. Here, the pair of driving sockets 12A and 12B and the pair of detecting sockets 13A and 13B are formed so as to be opposed to each other via the bearing unit 11. That is, the driving socket 12A and the detecting socket 13A, and the driving socket 12B and the detecting socket 13B are formed in the holder base 10 such that the bearing unit 11 is interposed therebetween. Though not shown, the pair of driving sockets 12A, 12B and the pair of detecting sockets 13A, 13B are formed with slits, respectively. The root portions of the respective sockets (12A, 12B, 13A, and 13B) are spread in a pressing manner through the slits so that the respective rods (50A, 50B, 80A, and 80B) can be fitted to the sockets easily.

Openings for plate spring 14 extending from a surface of the holder base 10 to a back face thereof in a communicating manner are formed between the sockets adjacent to each other along the circumferential direction, namely, between the driving socket 12A and the driving socket 12B, between the driving socket 12B and the detecting socket 13A, between the detecting socket 13A and the detecting socket 13B, and between the detecting socket 13B and the driving socket 12A (four portions in FIG. 3A). A sliding piece 15 projecting from the back face of the holder base 10 is formed on an inner wall face defining the opening for plate spring 14 on an outer peripheral side of the holder base 10. A pair of openings for rotation restricting protrusion 16, 16 which communicate from the surface of the holder base 10 to the back face (eight portions in FIG. 3A) respectively are formed between each of the sockets (12A, 12B, 13A, and 13B) and the bearing unit 11. A resilient portion 17 including a pair of resilient pieces is formed between the pair of openings for rotation restricting protrusion 16 and 16 so as to project from the back face of the holder base 10 (four pieces in FIG. 3A).

A groove 18 is formed on the surface of the holder base 10. The groove 18 is constituted of main grooves 18a formed around the bearing unit 11 and communication grooves 18b communicating from the main grooves 18a to the openings for plate spring 14. Engagement pieces for plate spring 19 are formed in the main groove 18a at a position where the bearing unit 11 and each resilient portion 17 are opposed to each other so as to project from the surface of the holder base (four pieces in FIG. 3A).

Figure 4A:
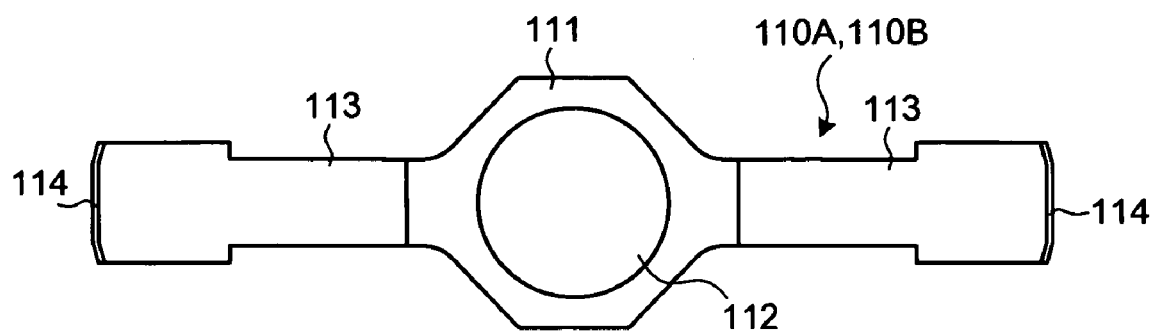
FIG. 4A is a plan view of a plate spring.
Figure 4B:
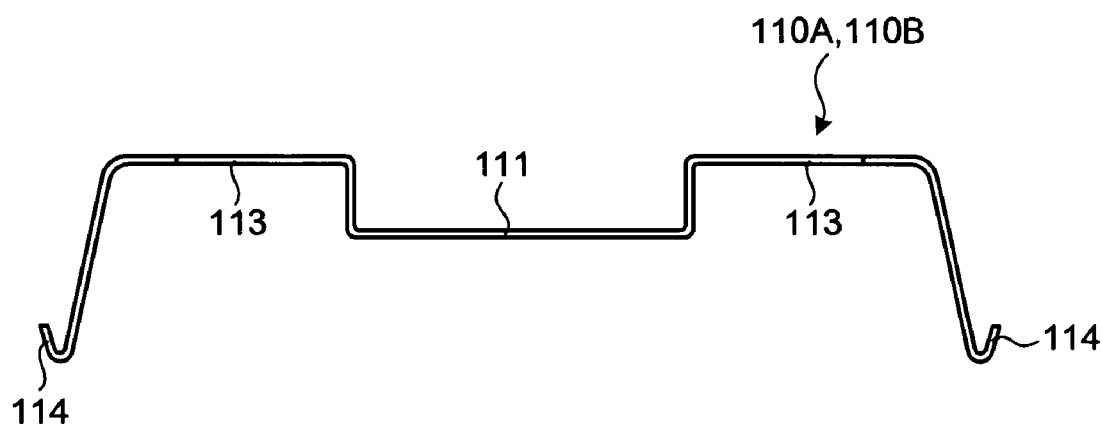
FIG. 4B is a front view of the plate spring.

As shown in FIG. 1, two plate springs 110A and 110B are mounted on the holder base 10. The two plate springs 110A and 110B prevent vibrations between the holder base 10 and the housing 40. FIGS. 4A and 4B are constitutional examples of a plate spring. As shown in FIGS. 4A and 4B, the plate springs 110A and 110B are formed in a plate shape. The plate springs 110A and 110B are respectively formed at their central portions 111 with openings for bearing unit 112 into which the bearing unit 11 projecting from the main groove 18a of the holder base 10 is inserted. Each plate spring 110A, 110B has plate spring extending portions 113 and 113 corresponding to the communication grooves 18b of the holder base 10, which are formed by bending both ends of the central portion 111 upward and bending them horizontally. In each plate spring 110A, 110B, end portions of the plate spring extending portions 113 and 113 are bent downward so as to be inserted into the openings for plate spring 14 and 14 of the holder base 10 and turn-back portions 114 are formed at the end portions bent downward.

FIGS. 5A, 5B, and FIGS. 6A, 6B are constitutional examples of the housing lid 20. As shown in FIGS. 5A, 5B, and FIGS. 6A, 6B, the housing lid 20 of the housing 40 is made of synthetic resin and the like and is formed in a disc shape. The pivot shaft 21 is formed at a central portion of a surface of the housing lid 20. The pivot shaft 21 has a spherical distal end, which is fitted into the bearing unit 11 of the holder base 10. The pivot shaft 21 has a hollow structure and is formed with a housing lid communication hole 21a extending or communicating from the distal end to a back face of the housing lid 20.

A pair of driving rod through holes 22A, 22B and a pair of detecting rod through holes 23A, 23B corresponding to the pair of driving sockets 12A, 12B and the pair of detecting sockets 13A, 13B of the holder base 10 are formed near an outer peripheral edge of the housing lid 20. Here, the respective rod through holes (22A, 22B, 23A, and 23B) are formed at intervals of 90° along a circumferential direction of the housing lid 20 near the outer peripheral edge thereof. The pair of driving rods 50A, 50B described later are projected from/retracted into the pair of driving rod through holes 22A, 22B of the housing lid 20, namely, from/into the housing 40 by the pair of driving units 60A, 60B. On the other hand, the pair of detecting rods 80A, 80B described later are projected from/retracted into the pair of detecting rod through holes 23A, 23B, namely, from/into the housing 40 by tilting of the holder base 10 due to projection/retraction of the pair of driving rods 50A, 50B from/into the housing 40. Each of curved protrusions 24 protruding toward the holder base 10 is formed between the rod through holes adjacent to each other along the circumferential direction, that is, the curved protrusions 24 are formed between the driving rod through hole 22A and the driving rod through hole 22B, between the driving rod through hole 22B and the detecting rod through hole 23A, between the detecting rod through hole 23A and the detecting rod through hole 23B, and between the detecting rod through hole 23B and the driving rod through hole 22A. The sliding piece 15 of the holder base 10 abuts on the curved protrusion 24 and the former slides on the latter.

A first annular projection 20a projecting toward the housing body 30 described later is formed at the outer peripheral edge of the housing lid 20. Housing temporarily retaining pieces 20b engaged with housing temporarily retaining holes 30b of the housing body 30 described later are formed on the first annular projection 20a at predetermined intervals (eight pieces in FIG. 5A). A second annular projection 20c projecting toward the housing body 30 is formed inside the first annular projection 20a, namely, near an outer peripheral edge on a back face of the housing lid 20, so as to surround the respective rod through holes (22A, 22B, 23A, and 23B). A detecting retaining member 25 that retains a detecting connector 95 of a detecting member 93 of a detector 90 described later is formed near the central portion on the back face of the housing lid 20 so as to project toward the housing body 30.

Figure 5A:
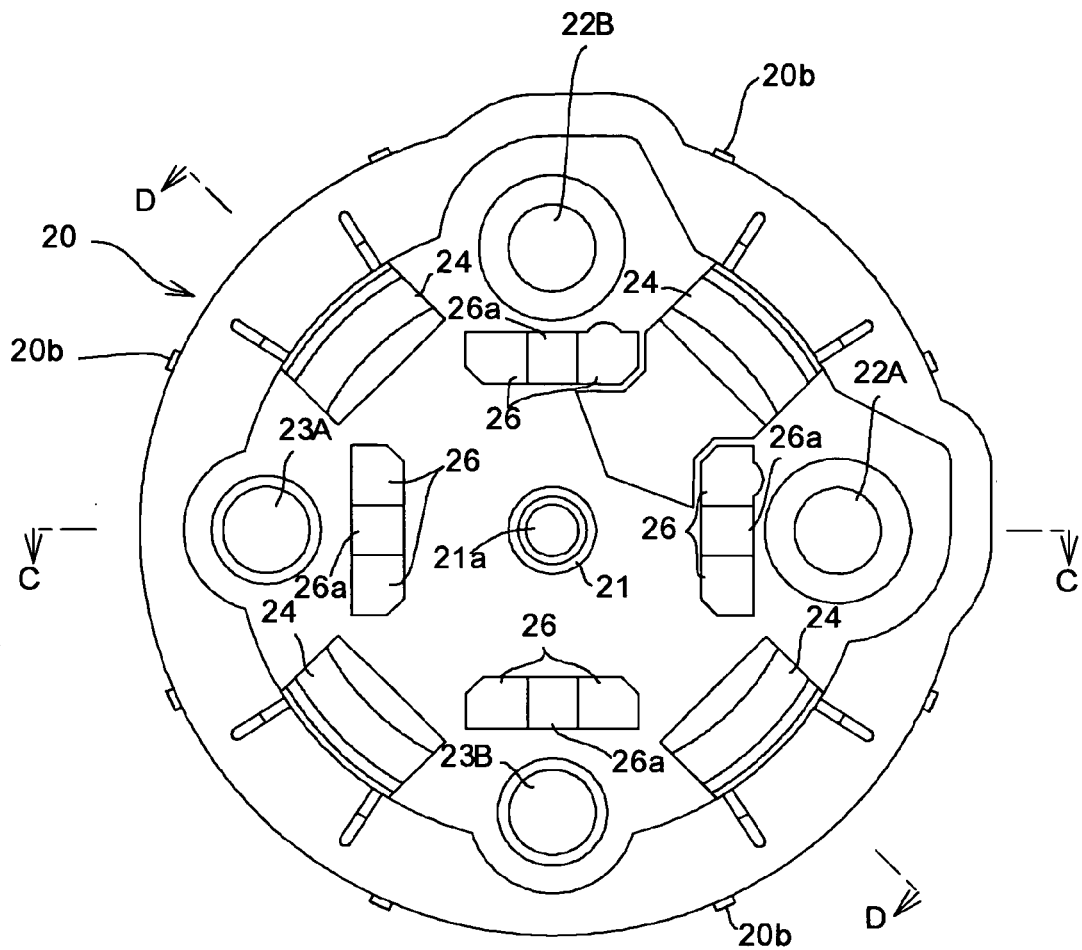
FIG. 5A is a plan view of a housing lid.
Figure 5B:
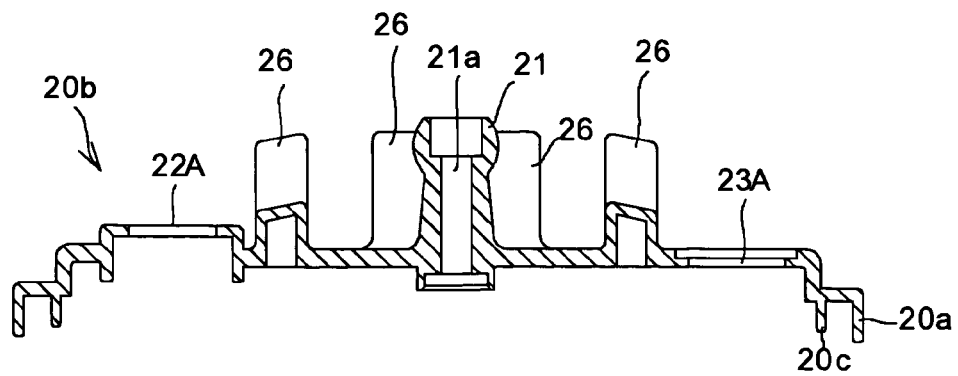
FIG. 5B is a sectional view taken along line C-C in FIG. 5A.
Figure 6A:
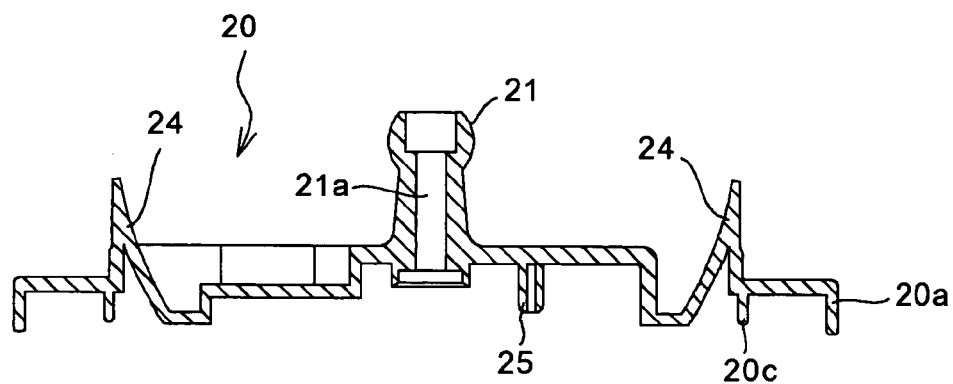
FIG. 6A is a sectional view taken along line D-D in FIG. 5A.
Figure 6B:
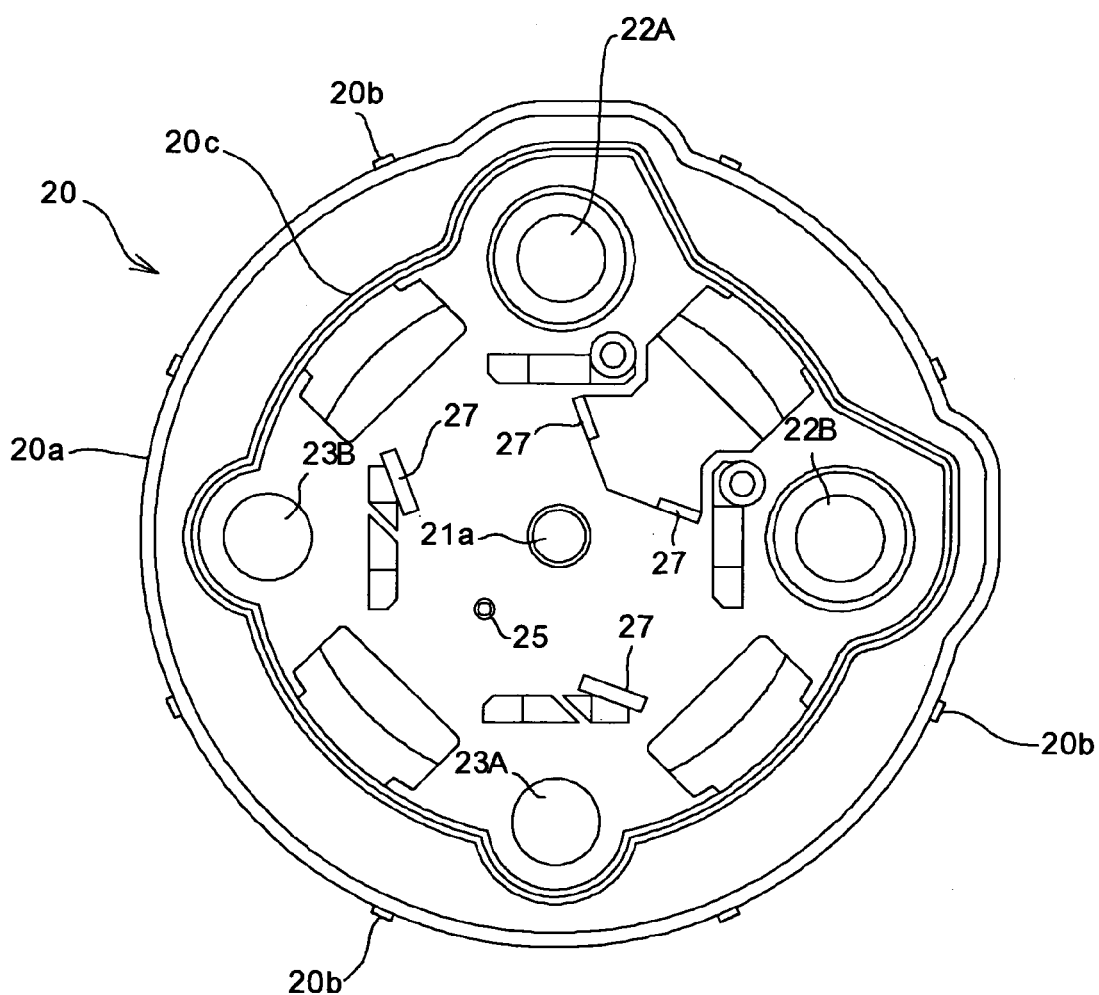
FIG. 6B is a rear view of the housing lid.

A pair of rotation restricting protrusions 26 projecting toward the holder base 10 respectively are formed between each rod through hole (22A, 22B, 23A, and 23B) of the housing lid 20 and the pivot shaft 21 (eight pieces in FIG. 5A). That is, the respective pairs of rotation restricting protrusions 26 are formed at intervals of 90° along an outer periphery of the pivot shaft 21. A resilient portion of the holder base 10 is inserted into a space 26a formed between the pair of rotation restricting protrusions 26 in a biased manner. Here, the width of the space 26a is set smaller than the width of the pair of resilient pieces constituting the resilient portion 17 of the holder base 10. Reference sign 27 denotes a motor fixing member for fixing a motor 64 of a driving unit 70 described later between the housing lid 20 and the housing body 30.

In the housing lid 20, as shown in FIG. 1, driving rod sealing members 120 are inserted into the pair of driving rod through holes 22A, 22B, and two retractable portions 132 of a detecting-rod sealing member 130 are inserted into the pair of detecting rod through holes 23A, 23B. The driving rod sealing members 120 and the detecting-rod sealing member 130 perform sealing between each rod through hole (22A, 22B, 23A, and 23B) and each rod (50A, 50B, 80A, and 80B) for preventing external water from entering into interior of the housing 40. The driving rod sealing members 120 are obtained by forming elastic material such as rubber into a ring-like shape, and they have driving rod openings 121, as shown in FIG. 1.

Figure 7A:
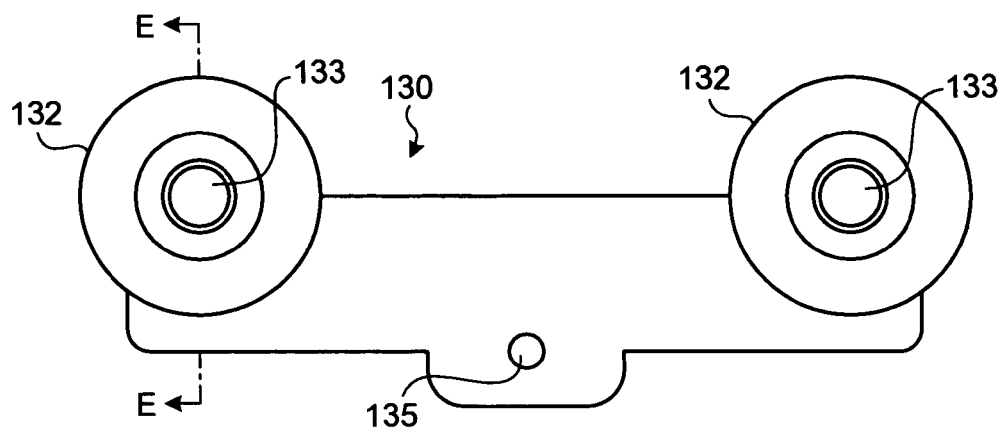
FIG. 7A is a plan view of a detecting-rod sealing member.
Figure 7B:
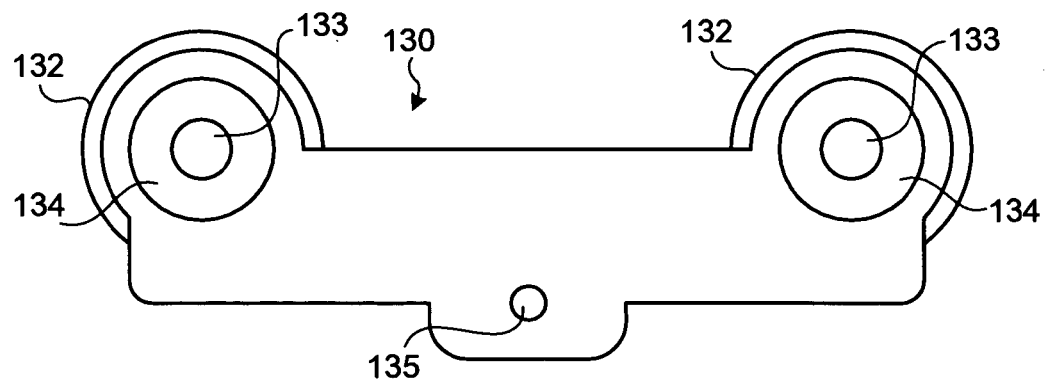
FIG. 7B is a back face back of the detecting-rod sealing member.
Figure 7C:
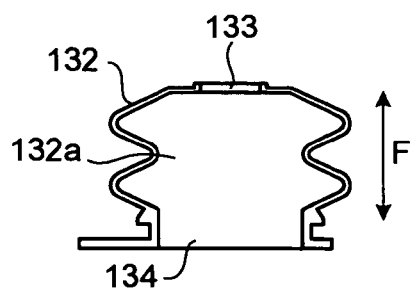
FIG. 7C is a sectional view taken along line E-E in FIG. 7A.
Figure 8A:
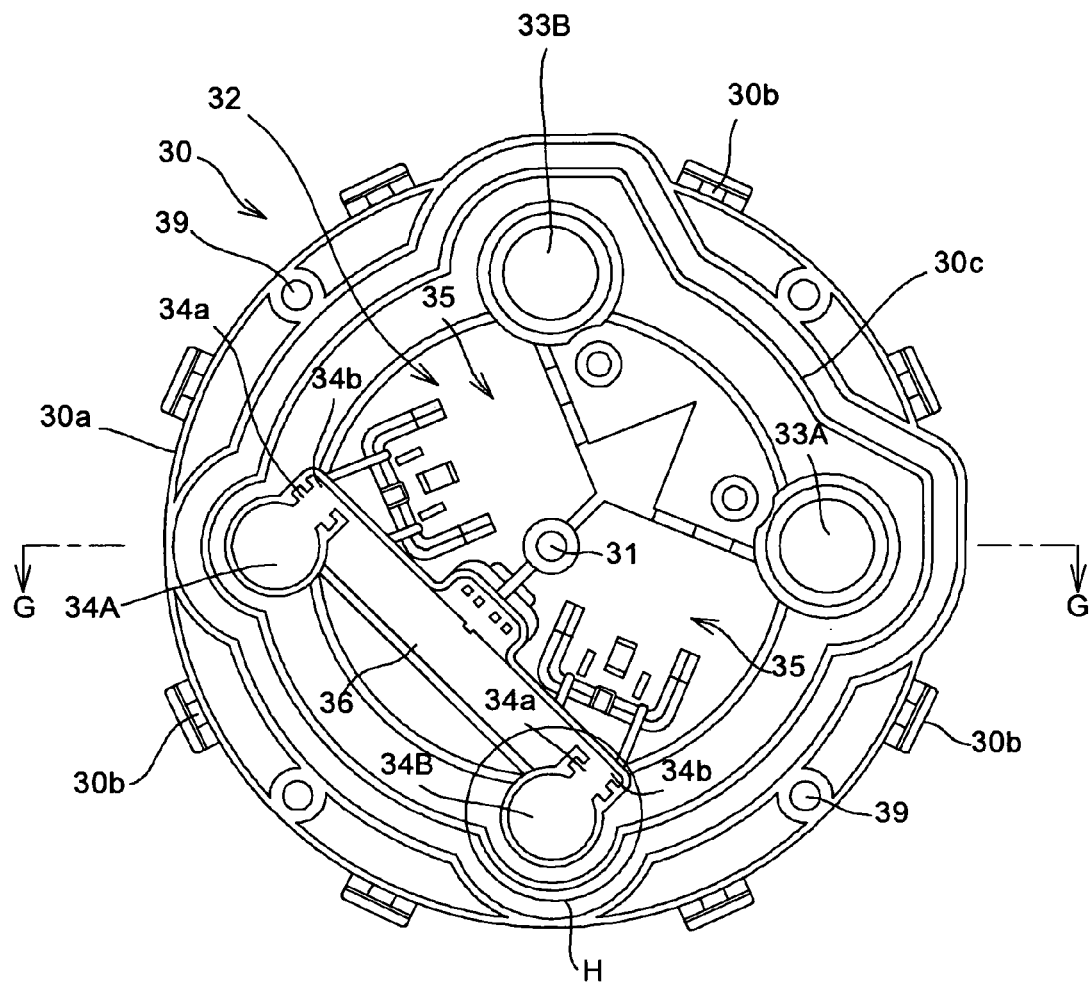
FIG. 8A is a plan view of a housing body.
Figure 8B:
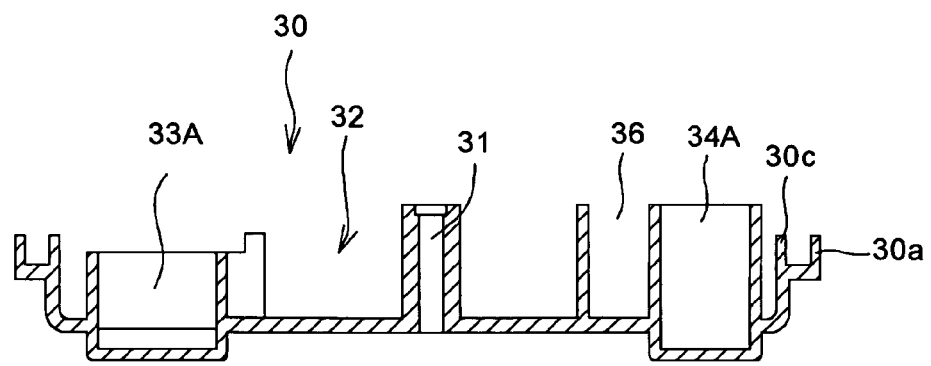
FIG. 8B is a sectional view taken along line G-G in FIG. 8A.

FIGS. 7A to 7C are constitutional examples of the detecting-rod sealing member. As shown in FIGS. 7A to 7C, the detecting-rod sealing member 130 is made of elastic material such as rubber, and is constituted of a sealing member main body 131 and two retractable portions 132. The sealing member main body 131 is formed in a flat plate shape, it is interposed between the housing lid 20 and the housing body 30 described later, and an area thereof is set so as be able to cover an outer periphery of a detector accommodating portions 36 and detecting rod guiding portions 34A, 34B of the housing body 30 described later. The retractable portions 132 projecting so as to oppose to the holder base 10, namely, the pair of detecting rod through holes 23A, 23B of the housing lid 20 are formed at both end portions of the sealing member main body 131. As shown in FIG. 7C, the retractable portion 132 is formed in a cylindrical shape with a hollow portion 132a. The retractable portion 132 has a bellows-like sectional shape, and it is retractable in a direction of arrow F. A detecting rod opening 133 surrounding an outer periphery of the detecting rod 80A or 80B, described later, arranged in the hollow portion 132a is formed at a distal end of the retractable portion 132. Reference sign 134 denotes a rod inserting opening, and reference sign 135 denotes a retaining member opening into which the detecting retaining member 25 of the housing lid 20 is inserted.

FIGS. 8A, 8B, and FIGS. 9A, 9B are constitutional examples of the housing body. As shown in FIGS. 8A, 8B, and FIG. 9A, 9B, the housing body 30 of the housing 40 is made of synthetic resin or the like and is formed in a disc shape. A housing body communication hole 31 opposed to the housing lid communication hole 21a of the housing lid 20 is formed at a central portion of the housing body 30. The housing body communication hole 31 communicates from a surface of the housing body 30 to a back face thereof, and a housing communication hole is constituted of the housing body communication hole 31 and the housing lid communication hole 21a. Accordingly, the housing communication hole communicates from the distal end of the pivot shaft 21 of the housing lid 20 up to the back face of the housing 40.

A first annular projection 30a projecting toward the housing lid 20 is formed at an outer peripheral edge of the housing body 30. Housing temporarily retaining holes 30b engaged with housing temporarily retaining pieces 20c of the housing lid 20 are formed on the first annular projection 30a at predetermined intervals (eight pieces in FIG. 8A). A recess portion 32 is formed around the housing body communication hole 31, and a second annular projection 30c projecting toward the housing lid 20 is formed on an outer peripheral edge of the recess portion 32. A pair of driving rod guiding portions 33A, 33B corresponding to the pair of driving rod through holes 22A, 22B of the housing lid 20 are formed on the recess portion 32. A pair of detecting rod guiding portions 34A, 34B corresponding to the pair of detecting rod through holes 23A, 23B are also formed on the recess portion 32. Each of these rod guiding portions (33A, 33B, 34A, and 34B) is cylindrical and is formed so as to project toward the housing lid 20.

Driving unit accommodating portions 35 which accommodate driving units 60A, 60B driving respective ones of a pair of driving rods 50A, 50B described later are formed near the driving rod guiding portions 33A, 33B on the recess portion 32. The driving unit accommodating portions 35 are formed in a V shape so as not to interfere with the housing body communication hole 31. On the other hand, a detector accommodating portion 36 which accommodates a detecting member 93 provided with resistors 92 of detectors 90A, 90B described later is formed near the detecting rod guiding portions 34A, 34B. Extending portions 34a here are respectively provided on the detecting rod guiding portions 34A, 34B diametrically outward of the detecting rod guiding portions 34A, 34B, namely, on the side of the detector accommodating portion 36. The respective extending portions 34a are formed with notches 34b causing the detecting rod guiding portions 34A, 34B to communicate with the detector accommodating portion 36 (refer to FIG. 9B). The respective notches 34b are formed for allowing sliding members 91 of the detectors 90A, 90B fixed to the pair of detecting rods 80A, 80B to slide on the resistors 92 of the detecting member 93 accommodated in the detector accommodating portion 36.

Drive power source connector receivers 37, 37 which respectively correspond to motors 64, 64 of the driving units 60A, 60B accommodated in the driving unit accommodating portions 35 are formed on a back face of the housing body 30. An external connector receiver 38 corresponding to the detecting connector 95 of the detecting member 93 accommodated in the detector accommodating portion 36 is formed on a back face of the housing body 30. Reference sign 39 denotes a positioning hole into which a positioning protrusion 201 formed on an outer mirror base 200 is inserted (four in FIG. 8A).

Figure 10A:
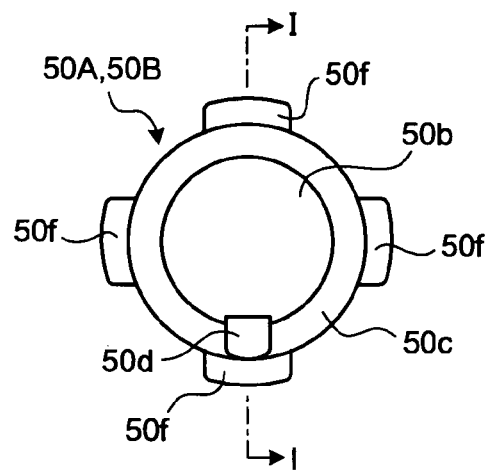
FIG. 10A is a plan view of a driving rod.
Figure 10B:
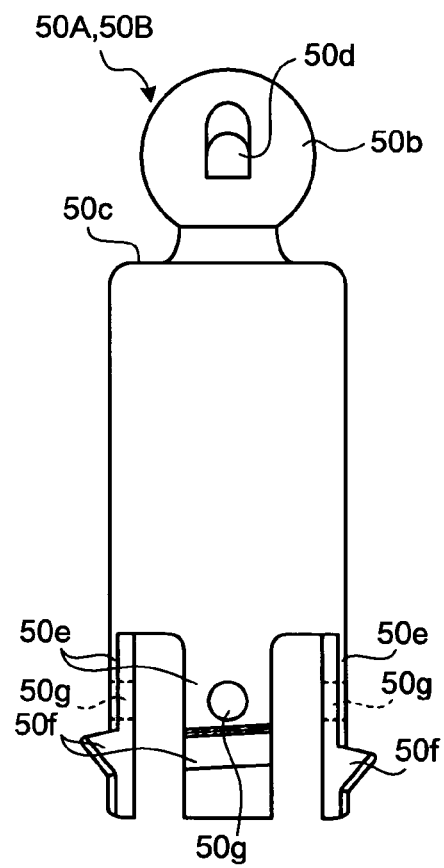
FIG. 10B is a front view of the driving rod.
Figure 10C:
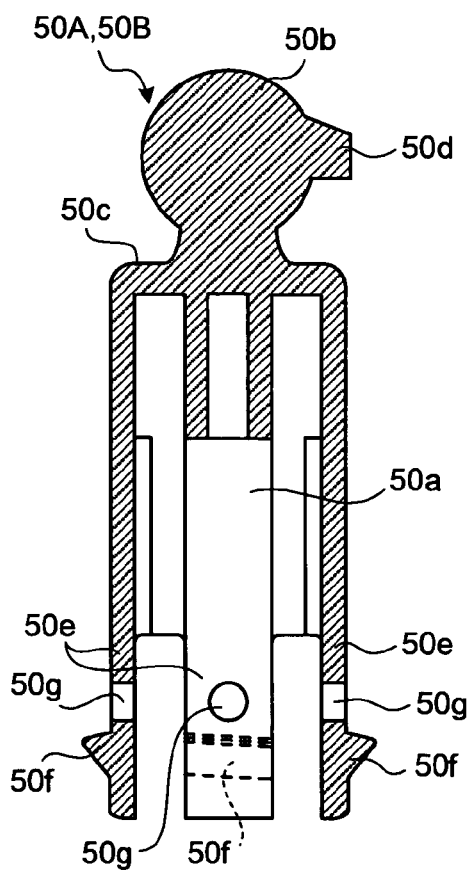
FIG. 10C is a sectional view taken along line I-I in FIG. 10A.

As shown in FIG. 2, the rod driving mechanism 70 is constituted of a pair of driving rods 50A, 50B arranged inside the housing 40 and driving units 60A, 60B that drive the pair of driving rods 50A, 50B, respectively. FIGS. 10A to 10C are constitutional examples of the driving rod. The holder base 10 and the main body fixed to the holder base 10 are tilted in left and right directions by the driving rod 50A and the driving unit 60A and in upward and downward directions by the driving rod 50B and the driving unit 60B. The pair of driving rods 50A, 50B are made of synthetic resin and the like and have cylindrical shapes with a hollow portion 50a, as shown in FIG. 2 and FIGS. 10A to 10C. A distal end 50b of each of the pair of driving rods 50A, 50B is formed in a spherical shape. Each of the pair of driving rods has a step 50c formed near the distal end 50b. A distal end protrusion 50d projecting in a diametrically outward direction of each of the pair of driving rods 50A, 50B is formed at the distal end 50b. Each distal end protrusion 50d is formed so as have a width narrower than each of the widths of slits formed on the pair of driving sockets 12A, 12B of the holder base 10.

Four legs 50e are formed on a lower portion of each of the pair of driving rods 50A, 50B by four slits, not shown. A sliding click 50f projecting in a diametrically outward direction of each of the pair of driving rods 50A, 50B is formed on each of these legs 50e. The sliding click 50f is provided in an inclined manner to a horizontal direction of each of the pair of driving rods 50A, 50B. Reference sign 50g denotes a spring fixing hole for fixing a spring 140 described later in each hollow portion 50a of the pair of driving rods 50A, 50B.

Figure 11A:
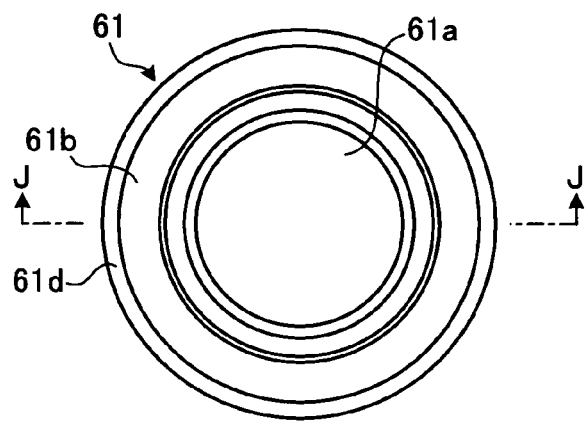
FIG. 11A is plan view of a first gear.
Figure 11B:
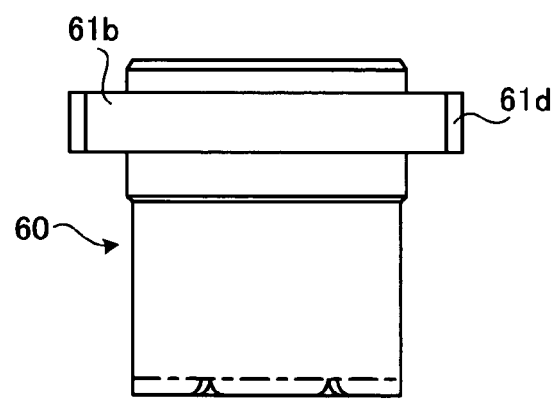
FIG. 11B is a front view of the first gear.
Figure 11C:
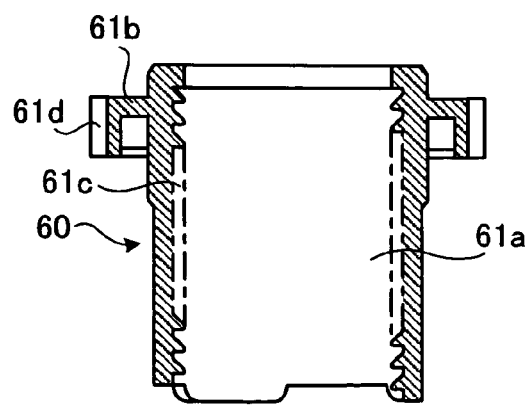
FIG. 11C is a sectional view taken along line J-J in FIG. 11A.

As shown in FIG. 2 and FIGS. 11A to 11C, each of the driving units 60A, 60B is constituted of a first gear 61, a second gear 62, a third gear 63, and a motor 64. As shown in FIGS. 11A to 11C, the first gear 61 is made of synthetic resin or the like, and has a cylindrical shape with a hollow portion 61a. The first gear 61 is formed at an upper portion thereof with a flange 61b. A female screw 61c screwed with the sliding clicks 50f of each of the pair of driving rods 50A, 50B is formed on an inner wall face of the hollow portion 61a. An external gear 61d is formed on a side face of the flange 61b. As shown in FIG. 2, the second gear 62 is formed on upper and lower portions thereof with two different external gears 62a, 62b, and the external gear 62a on the upper portion meshes with the external gear 61d of the first gear 61, while the external gear 62b on the lower portion meshes with the third gear 63 inserted and fixed to a rotational shaft of the motor 64. Here, the external gear 62b of the second gear on the lower portion and the third gear 63 constitute a worm gear mechanism. The motor 64 is externally supplied with power from a driving power source connector inserted into the driving power source connector receiver 37 of the housing body 30. A rotational shaft, not shown, is rotated by the supplied power, so that the first gear 61 is forward and backward rotated via the third gear 63 inserted and fixed to the rotational shaft and the second gear 62.

Figure 12A:
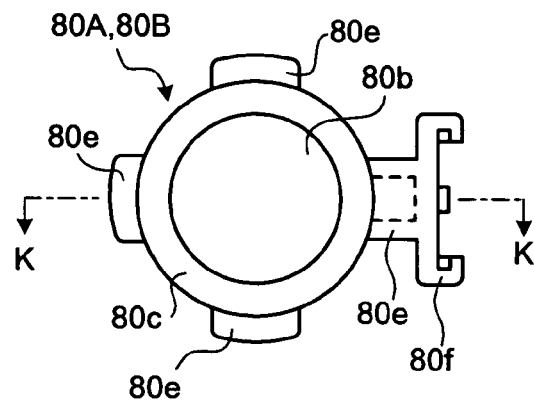
FIG. 12A is a plan view of a detecting rod.
Figures 12B, 12C:
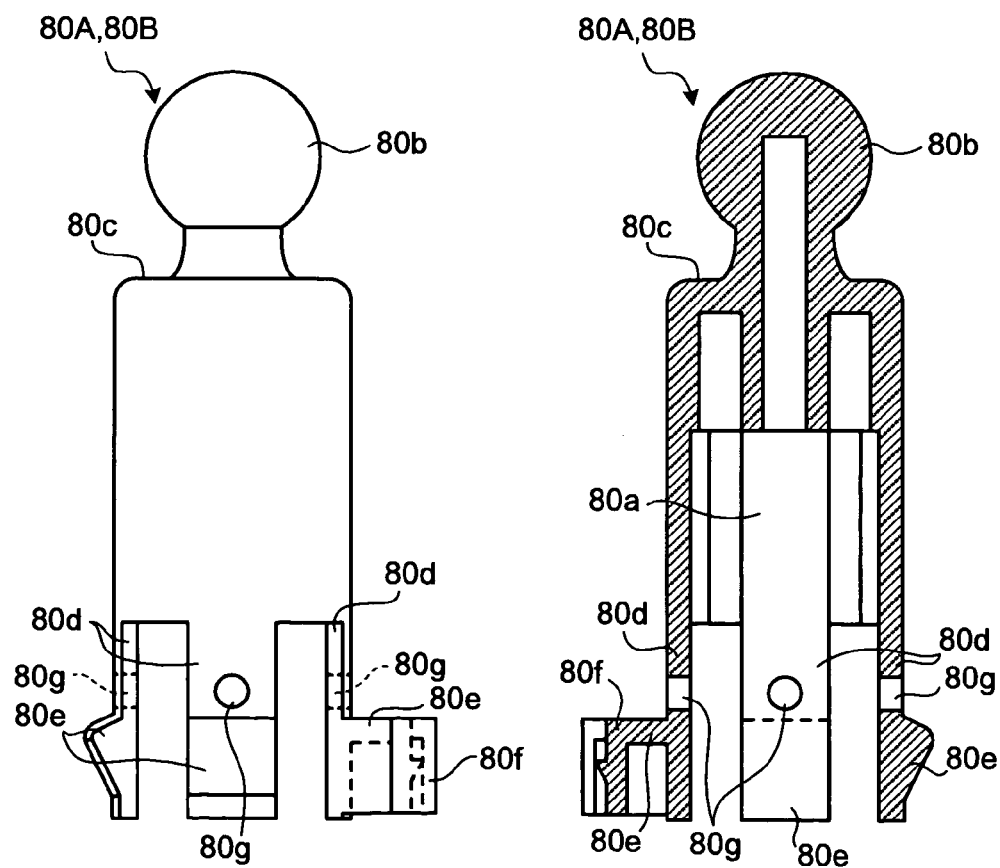
FIG. 12B is a front view of the detecting rod.
FIG. 12C is a cross sectional view taken along line K-K in FIG. 12A.
Figure 13A:
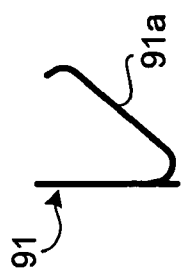
FIG. 13A is a front view of a sliding member.
Figure 13B:
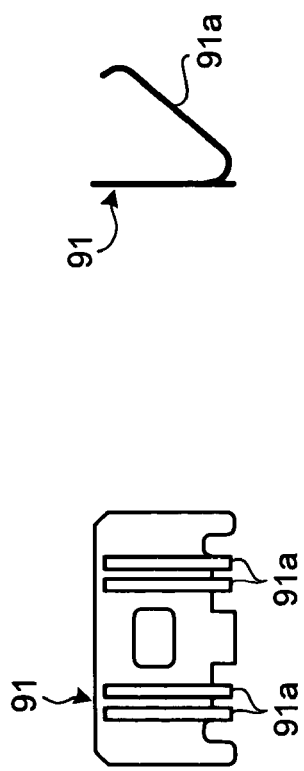
FIG. 13B is a side view of the sliding member.
Figure 13C:
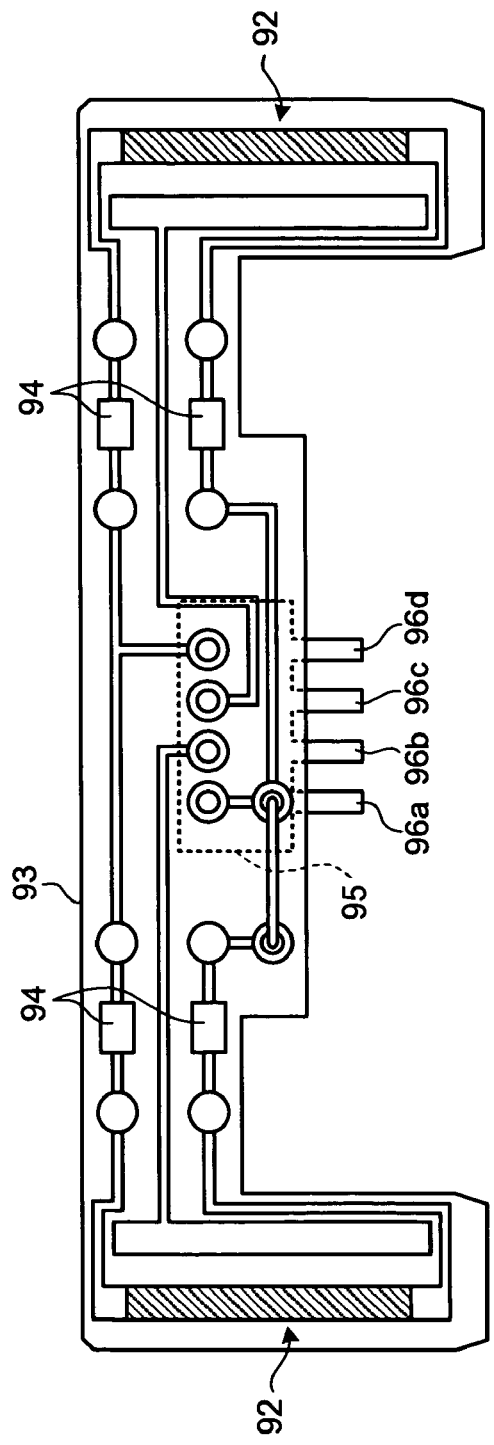
FIG. 13C is a front view of a detecting member.

As shown in FIG. 2, the rod detecting mechanism 100 is constituted of a pair of detecting rods 80A, 80B disposed in the housing 40 and detectors 90A, 90B that detect projection/retraction amounts of the pair of detecting rods 80A, 80B from/into the housing 40. FIGS. 12A to 12C are constitutional examples of the detecting rod. FIGS. 13A to 13C are constitutional examples of the detector. The detecting rod 80A and the detector 90A detect a tilting angle of the holder base 10 and the main body fixed to the holder base 10 in left and right directions thereof. Further, the detecting rod 80B and the detector 90B detect the tilting angle of the holder base 10 and the main body fixed to the holder base 10 in upward and downward directions thereof. As shown in FIG. 2 and FIGS. 12A to 12C, each of the pair of detecting rods 80A, 80B is made of synthetic resin or the like, and has a cylindrical shape with a hollow portion 80a. A distal end 80b of each of the pair of detecting rods 80A, 80B is formed in a spherical shape. Further, a step 80c is formed near the distal end 80b.

Four legs 80d are formed on a lower portion of each of the pair of detecting rods 80A, 80B by four slit, not shown. Engagement clicks 80e projecting in a diametrically outward direction of each of the pair of detecting rods 80A, 80B are formed on each leg 80d. A sliding member fixing portion 80f with a recessed sectional shape in a horizontal direction of each of the pair of detecting rods 80A, 80B is formed on one of the engagement clicks 80e. The sliding member fixing portion 80f is formed at a portion of the engagement click 80e opposed to an inner peripheral face of one of the pair of detecting rod guiding portions 34A, 34B, and it is fixed with one of sliding members 91, 91 of the detectors 90A, 90B described later. Reference sign 80g denotes a spring fixing hole for fixing a spring 140 described later in the hollow portion 80a of one of the pair of detecting rods 80A, 80B.

As shown in FIG. 2 and FIGS. 13A to 13C, each of the detectors 90A, 90B is constituted of a sliding member 91 and a resistor 92. The sliding member 91 is made of metal material with electrical conductivity or the like, and it includes a plurality of sliding pieces 91a with resilience (four pieces in FIG. 13A). Each resistor 92 of each detector 90A, 90B is provided on one detecting member 93 made of plastic plate or the like, namely it is printed thereon. Accordingly, the number of parts for the outer mirror that can detect the tilting angle of the main body can further be reduced, and reduction in the number of assembling steps and reduction in manufacturing cost can be achieved. A plurality of voltage-dividing resistors 94 for each resistor 92 are provided on the detecting member 93 (four pieces in FIG. 13C). The voltage-dividing resistor 94 is for setting electric output varying according to sliding of the sliding piece 91a of the sliding member 91 on the resistor 92, namely, change of voltage to a predetermined change width. The detecting connector 95 that outputs electric outputs of the respective resistors 92 is provided at a central portion on a face of the detecting member 93 opposed to a face where the resistors 92 are provided.

A plurality of connecting terminals 96a to 96d for electrical connection with an external connector, not shown, are provided on the detecting connector 95 (four pieces in FIG. 13C). The connecting terminals 96a, 96b here are for externally outputting an electrical output of the detector 90A varying when the tilting angle of the holder base 10 are changed in a left or right direction. On the other hand, the connecting terminals 96c, 96d are for externally outputting an electrical output of the detector 90B varying when the tilting angle of the holder base 10 are changed in an upward or downward direction.

Figure 14A:
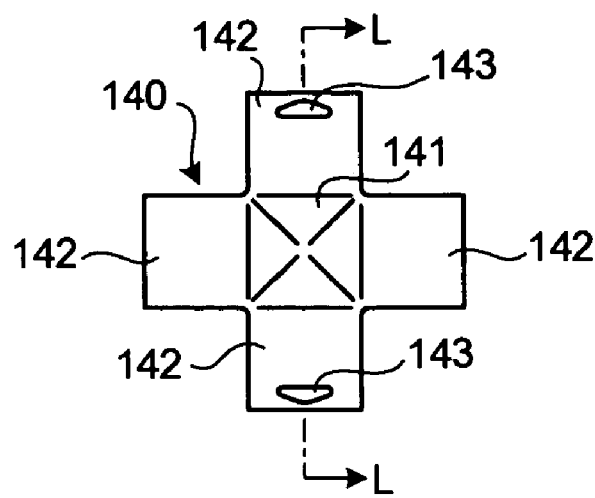
FIG. 14A is a plan view of a spring.
Figure 14B:
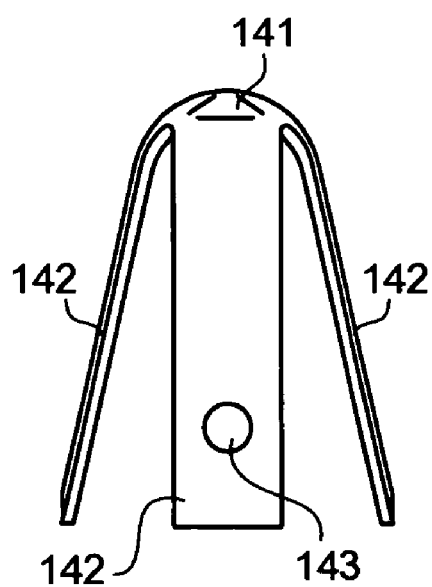
FIG. 14B is a front view of the spring.
Figure 14C:
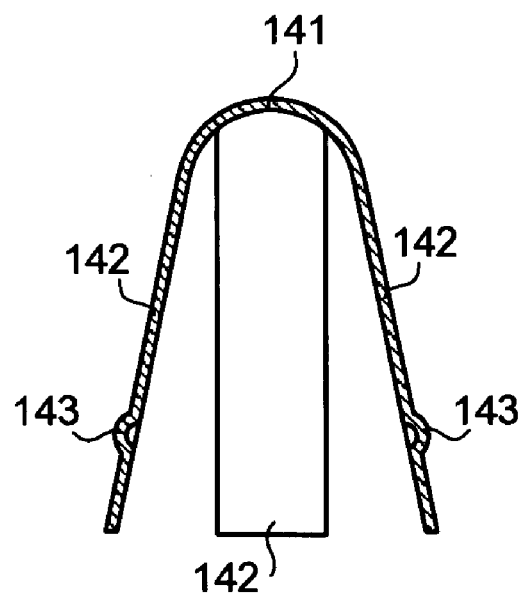
FIG. 14C is a cross sectional view taken along line L-L in FIG. 14A.

As shown in FIG. 2, each rod (50A, 50B, 80A, and 80B) is inserted with a spring 140 which is a resilient member. This spring prevents vibrations from generated between each rod (50A, 50B, 80A, and 80B) and the housing 40. FIGS. 14A to 14C are constitutional examples of the spring. As shown in FIGS. 14A to 14C, the spring 140 is made of a metal member having resilience, and it is constituted of a spring main body 141 and biasing portions 142. The biasing portions 142 extend from four sides of the spring main body 141. That is, the spring 140 has four biasing portions 142. The widths of the biasing portions 142, 142 opposed to each other are set to be larger than the widths of the pair of opposed legs 50e, 50e and a pair of opposed legs 80d, 80d of the respective rods (50A, 50B, 80A, and 80B). Spring fixing protrusions 143, 143 corresponding to the spring fixing holes 50g, 80g of each rod (50A, 50B, 80A, and 80B) are formed in the pair of opposed biasing portions 142, 142.

Figure 15A:
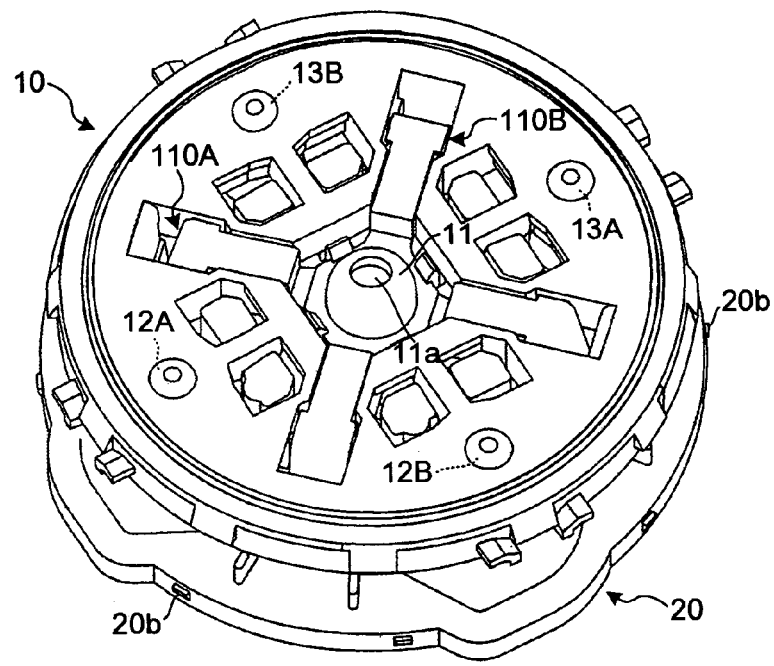
FIG. 15A is a schematic for illustrating a state of assembling the holder base and the housing lid.
Figure 15B:
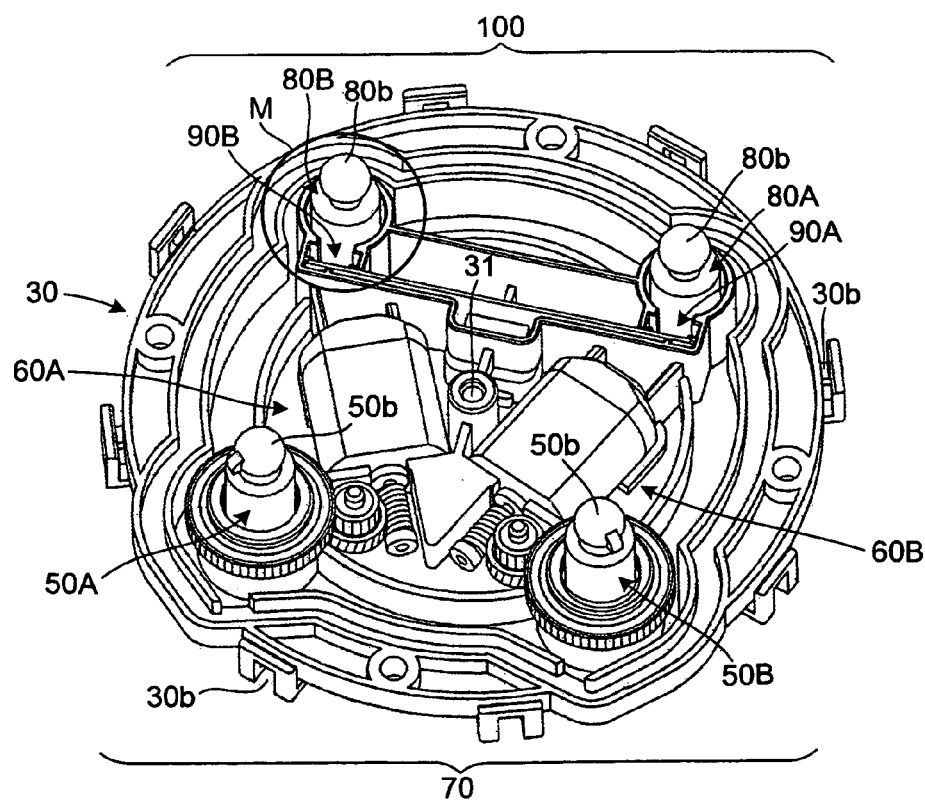
FIG. 15B is a schematic for illustrating a state of assembling the housing body, a rod driving mechanism, and a rod detecting mechanism.
Figure 16:
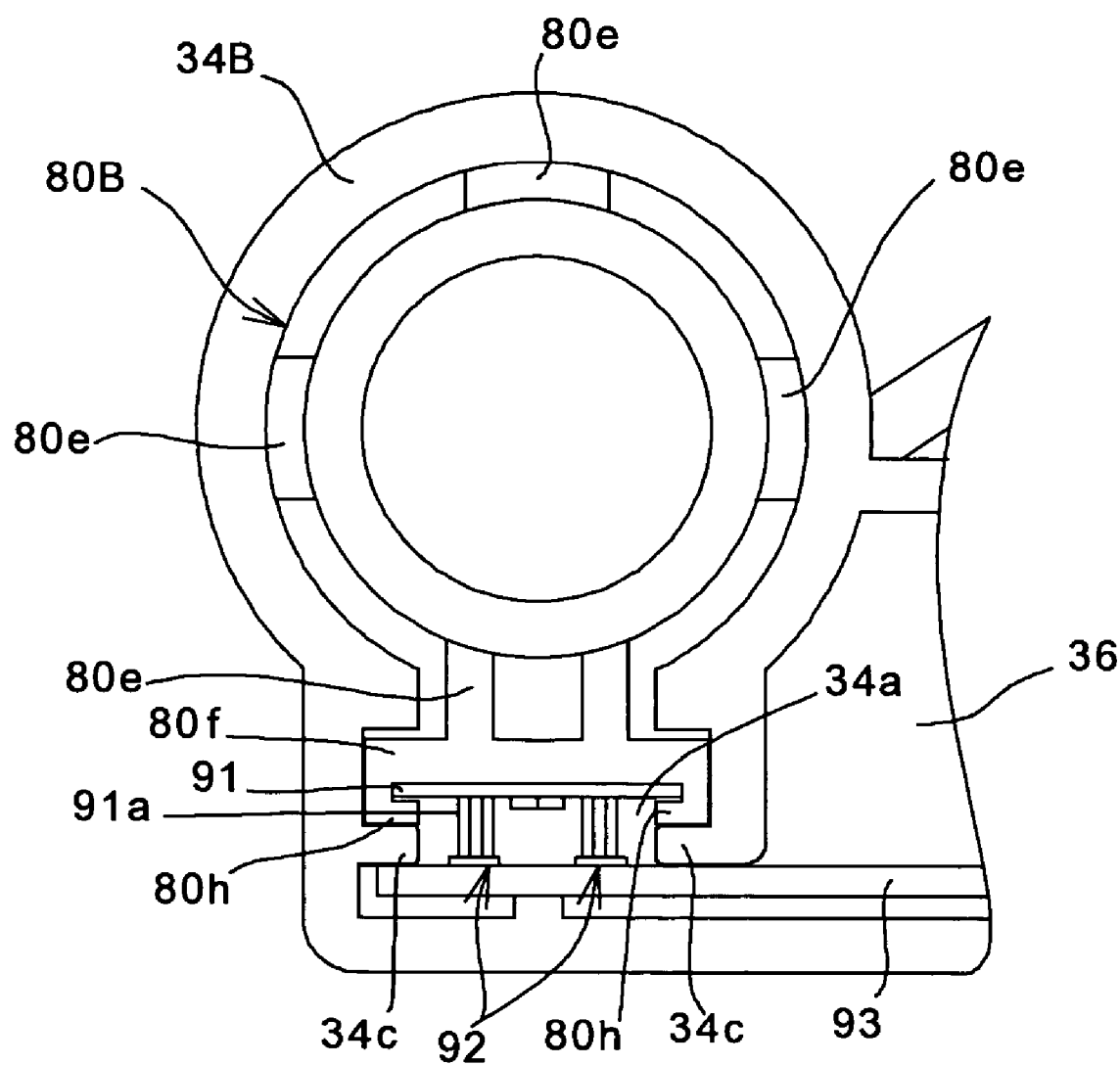
FIG. 16 is an enlarged plan view of a portion of the outer-mirror tilting apparatus indicated with a circle M in FIG. 15B.
Figure 17:
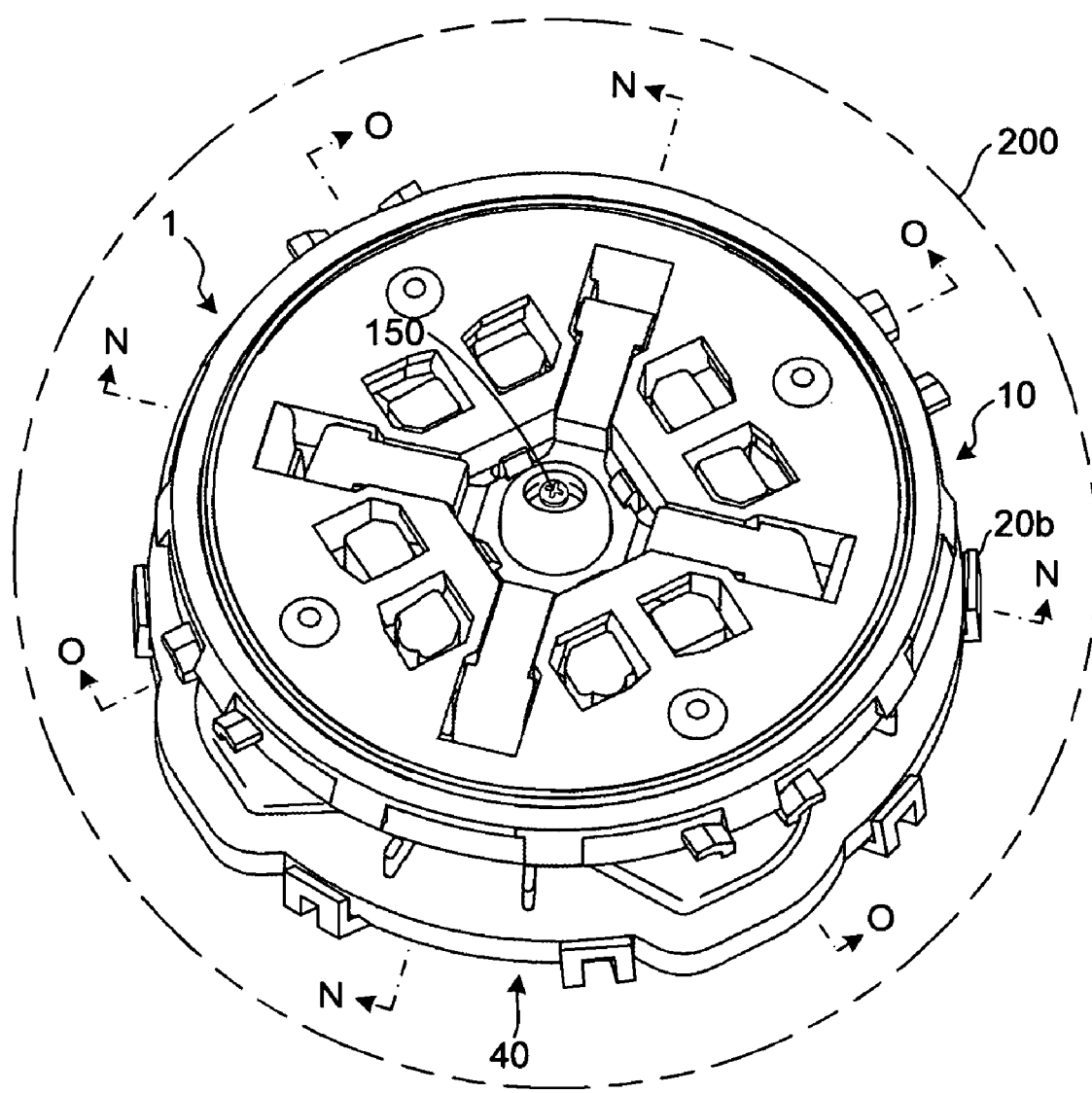
FIG. 17 is a perspective view of an assembly of an outer-mirror tilting apparatus.
Figure 18:
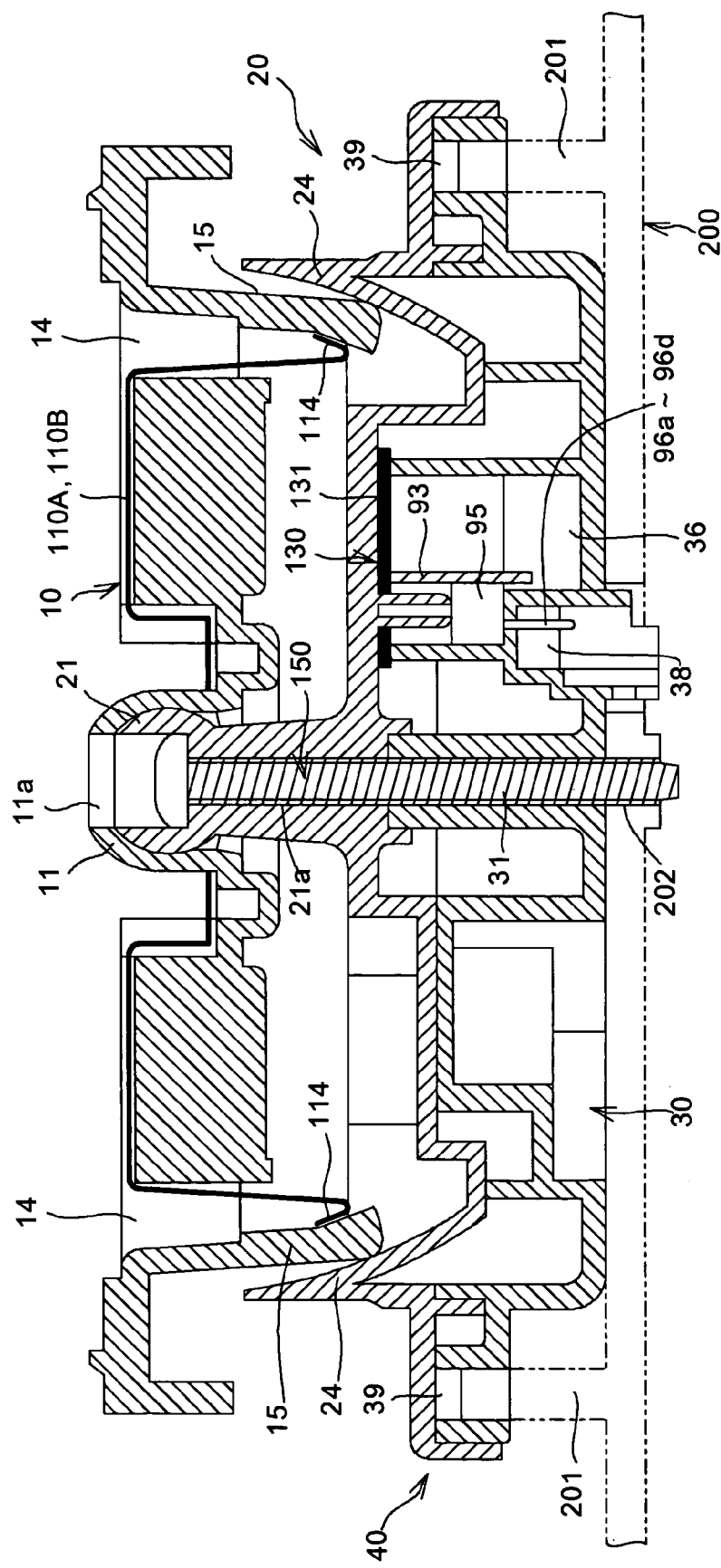
FIG. 18 is a sectional view taken along line N-N in FIG. 17.

A method for assembling the outer-mirror tilting apparatus 1 according to the present invention will be explained next. FIGS. 15A and 15B are perspective views of an outer-mirror tilting apparatus during assembling thereof. FIG. 16 is a plan view of a portion of the outer-mirror tilting apparatus indicated with a circle M in FIG. 15B. FIG. 17 is a perspective view of an assembled outer-mirror tilting apparatus. FIG. 18 is a sectional view of the outer-mirror tilting apparatus taken along line N-N in FIG. 17. FIG. 19 is a sectional view of the outer-mirror tilting apparatus taken along line O-O in FIG. 17.

As shown in FIG. 1, the pivot shaft 21 of the housing lid 20 is fitted into the bearing unit 11 of the holder base 10. At that time, as shown in FIG. 19, each resilient portion 17 of the holder base 10 is inserted in the space 26a between each pair of rotation restricting protrusions 26 of the housing lid 20. At that time, the resilient portion 17 resiliently deforms to abut on the rotation restricting protrusions 26 in a biased state. Thereby, the housing lid 20, that is, the holder base 10 can be prevented from rotating with respect to the housing 40, and vibrations in a rotational direction can be prevented from occurring.

As shown in FIG. 1, the plate springs 110A, 110B are inserted into the groove 18 of the holder base 10 in an overlapped state thereof in directions orthogonal to each other. The inserted plate springs 110A, 110B are engaged with the engagement pieces for plate spring 19. At that time, as shown in FIG. 18, respective turn back portions 114, 114 of the plate springs 110A, 110B are inserted into the openings for plate spring 14 of the holder base 10, and they abut on the sliding pieces 15 in a biased state. The sliding piece 15 is resiliently deformed by the turn back portion 114 on which the sliding piece 15 abuts in the biased state, so that the sliding piece 15 is abutted on the curved protrusion 24 of the housing lid 20 (refer to FIG. 18). Thereby, when the holder base 10 is tilted about the pivot shaft 21 of the housing lid 20, namely, it is tilted to the housing 40, vibrations between the housing lid 20, or the housing 40, and the holder base 10 can be prevented from occurring.

As shown in FIG. 1, two driving rod sealing members 120 are respectively inserted into the pair of driving rod through holes 22A, 22B of the housing lid 20 from the back face of the housing lid 20. On the other hand, the two retractable portions 132 of one detecting-rod sealing member 130 are respectively inserted into the pair of detecting rod through holes 23A, 23B of the housing lid 20 from the back face of the housing lid 20. According to the above procedures, the holder base 10 and the housing lid 20 are assembled, as shown in FIG. 15A.

As shown in FIG. 2, the rod driving mechanism 70 is disposed in the housing body 30 of the housing 40. Specifically, each third gear 63 is inserted into a rotational shaft, not shown, of each motor 64 to be fixed thereto. Next, the motor 64 and the second gear 62 constituting the driving unit 60A, and the motor 64 and the second gear 62 constituting the driving unit 60B are respectively accommodated in the respective driving unit accommodating portion 35. At that time, each second gear 62 is rotatably supported by a gear shaft, not shown, inside the housing body 30. The external gear 62b at the lower portion of the second gear 62 and the third gear 63 are meshed with each other. The respective first gears 61 of the driving units 60A, 60B are respectively inserted into the pair of driving rod guiding portions 33A, 33B. The respective first gears 61 are rotatably supported by the pair of driving rod guiding portions 33A, 33B. At that time, the external gear 61d of each first gear 61 and the external gear 62a at the upper portion of each second gear 62 are meshed with each other.

The respective springs 140 are respectively inserted into the hollow portions 50a of the pair of driving rods 50A, 50B. The respective sliding clicks 50f of the pair of driving rods 50A, 50B are screwed to the female screws 61c of the respective first gears 61 of the driving units 60A, 60B. At that time, since the widths of the opposed biasing portions 142, 142 of each spring 140 are larger than those of the pair of opposed legs 50e, 50e of each of the pair of driving rods 50A, 50B, as shown in FIG. 19, the respective legs 50e resiliently deform in a diametrically outward direction of each of the pair of driving rods 50A, 50B, so that the respective sliding clicks 50f abut on the female screw 61c of the first gear 61, namely, an inner peripheral face of the first gear 61 in a biased state. Thereby, forces for projecting/retracting the pair of driving rods 50A, 50B from/into the housing 40 are increased so that vibrations generated between the housing 40 (the driving rod guiding portions 33A, 33B) and the pair of driving rods 50A, 50B can be reduced.

As shown in FIG. 2, the rod detecting mechanism 100 is disposed inside the housing body 30 of the housing 40. Specifically, the detecting member 93 provided with the respective resistors 92 for the detectors 90A, 90B is received in the detector accommodating portion 36 of the housing body 30. At that time, as shown in FIG. 18, the detecting connector 95 provided on the detecting member 93 is disposed at a position opposed to the external connector receiver 38 formed on the housing body 30. The connection terminals 96a to 96d of the detecting connector 95 project in the external connector receiver 38.

As shown in FIG. 2, the respective springs 140 are inserted into the hollow portions 50a of the pair of detecting rods 80A, 80B. The respective sliding members 91 of the detectors 90A, 90B are fixed to the respective sliding member fixing portions 80f of the pair of detecting rods 80A, 80B. The pair of detecting rods 80A, 80B are respectively inserted into the pair of detecting rod guiding portions 34A, 34B. At that time, since the width between the opposed biasing portions 142, 142 of each spring 140 is larger than width between the pair of the opposed legs 80d, 80d of the pair of detecting rods 80A, 80B, as shown in FIG. 19, the respective legs 80d resiliently deform in the diametrically outward directions of the pair of detecting rods 80A, 80B so that the respective engagement clicks 80e abut on the inner peripheral faces of the detecting rod guiding portions 34A, 34B in a biased state.

Thereby, force for projecting/retracting the detecting rods 80A, 80B from/into the housing 40 is increased so that vibrations generated between the housing 40 (detecting rod guiding portions 34A, 34B) and the pair of detecting rods 80A, 80B can be reduced. That is, deviations between positions of the respective sliding members 91 fixed to the pair of detecting rods 80A, 80B and the positions of the respective resistors 92 formed on the detecting member 93 due to the vibrations can be reduced. Accordingly, the followability of the pair of detecting rods 80A, 80B to tilting or inclination of the holder base 10 is prevented from deteriorating, and the detection accuracy of the tilting angle of the main body fixed to the holder base 10 can be prevented from lowering. Since vibrations generated between the housing 40 and the pair of detecting rods 80A, 80B can be reduced, vibrations of the holder base 10 where the detecting sockets 13A, 13B are tiltably fitted on the respective distal ends 80b of the pair of detecting rods 80A, 80B can be reduced. Thereby, vibrations of the main body fixed to the holder base 10 can be reduced, so that visibility of the main body can be prevented from lowering.

As shown in FIGS. 15A and 15B, the respective sliding members 91 fixed to the respective sliding member fixing portions 80f abut on the respective resistors 92 provided on the detecting member 93. Accordingly, as shown in FIG. 19, when the pair of detecting rods 80A, 80B move in a direction P of projection/retraction thereof, the respective sliding members 91 slide on the respective resistors 92. That is, the detectors 90A, 90B constitute a sliding type variable resistor. Thereby, the projection/retraction amounts of the pair of detecting rods 80A, 80B cause change of a resistance value, namely, change of a voltage, so that the tilting angle of the main body fixed to the holder base 10 can be easily and simply detected.

As shown in FIG. 15B, the respective sliding member fixing portions 80f of the pair of detecting rods 80A, 80B are disposed at the extending portions 34a of the pair of detecting rod guiding portions 34A, 34B. At that time, the both ends 34c, 34c of the notches 34b of the respective extending portions 34a abut on the both ends 80h, 80h of faces of the respective sliding member fixing portions 80f on which the sliding members 91 are fixed. That is, one portions of the respective sliding member fixing portions 80f abut on inner peripheral faces of the pair of detecting rod guiding portions 34A, 34B having the extending portions 34a. Thereby, biasing forces of the respective springs 140 which are resilient members are transmitted from the sliding member fixing portions 80f of the engagement clicks to inner peripheral faces of the pair of detecting rod guiding portions 34A, 34B. That is, biasing forces for sliding the sliding members 91 fixed to the respective sliding member fixing portions 80g on the respective resistors 92 are not influenced by the biasing forces of the springs 140. Accordingly, the respective sliding members 91 can slide on the respective resistors 92 accurately corresponding to the projection/retraction amounts of the pair of detecting rods 80A, 80B, so that detection accuracy of the tilting angle of the main body fixed to the holder base 10 can be prevented from lowering As shown in FIG. 16, both side faces of the respective sliding member fixing portions 80f abut on both side faces of the respective extending portions 34a. Thereby, when the pair of detecting rods 80A, 80B fitted to the pair of detecting sockets 13A, 13B of the holder base 10 described later is projected from/retracted into the housing 40 according to tilting of the holder base 10, since the both side faces of the sliding member fixing portions 80f fixed with each sliding member 91 abut on the both side faces of the respective extending portions 34a, the pair of detecting rods 80A, 80B are restricted from rotation, even if they are biased so as to rotate. That is, the respective sliding members 91 can be prevented from being damaged due to that the pair of detecting rods 80A, 80B rotates inside the pair of detecting rod guiding portions 34A, 34B, respectively. The pair of detecting rods 80A, 80B are prevented from rotating to cause the positions of the respective sliding members 91 to the respective resistors 92 to change. Accordingly, the detection accuracy of the tilting angle of the main body fixed to the holder base is further prevented from lowering.

As shown in FIGS. 15A, 15B, and 19, the respective distal ends 50b of the pair of driving rods 50A, 50B are respectively fitted into the pair of driving sockets 12A, 12B via the respective driving rod openings 121 of the two driving rod sealing members 120 and the pair of driving rod through holes 22A, 22B of the housing lid 20. On the other hand, the distal ends 80b of the pair of detecting rods 80A, 80B are respectively fitted into the pair of detecting sockets 13A, 13B via the respective detecting rod openings 133 of the detecting-rod sealing member 130 and the pair of detecting rod through holes 23A, 23B of the housing lid 20. At that time, the respective distal end protrusions 50d of the pair of driving rods 50A, 50B are inserted into slit, not shown, of the pair of driving sockets 12A, 12B, so that the rotations of the pair of driving rods 50A, 50B are restricted. Since the respective distal ends 80b of the pair of detecting rods 80A, 80B are tiltably fitted into the pair of detecting sockets 13A, 13B formed on the tilting holder base 10, foreign matters are prevented from entering between the holder base 10 and the housing lid 20. Thereby, the followabilies of the pair of detecting rods 80A, 80B to tilting of the holder base 10 can be prevented from deteriorating, so that the detection accuracy of the tilting angle of the main body fixed to holder base 10 can be prevented from lowering As shown in FIGS. 15A, 15B, and 17, the housing body 30 is temporarily retained with the housing lid 20. That is, the housing temporarily retaining pieces 20b of the housing lid 20 are inserted into the housing temporarily retaining holes 30b of the housing body 30. Thereby, the housing lid 20 is retained to the housing body 30. Here, the first annular projection 30a of the housing body 30 and the second annular projection 30c abut on the first annular projection 20a of the housing lid 20 and the second annular projection 20c, respectively, so that positioning between the housing lid 20 and the housing body 30 is conducted.

At that time, as shown in FIG. 19, the sealing member main body 131 of the detecting-rod sealing member 130 abuts on the housing lid 20 and the housing body 30, and the detecting rods 80A, 80B are disposed in the hollow portions 132a of the respective retractable portions 132, so that a sealing structure of the housing 40 is constituted. That is, the back face of the housing lid 20, specifically, opposed to the pair of detecting rod guiding portions 34A, 34B and the detector accommodating portion 36 of the housing body 30 is covered with the sealing member main body 131, so that the sealing member main body 131 is interposed between the housing lid 20 and the housing body 30. Outer peripheries of the pair of detecting rods 80A, 80B are surrounded by the detecting rod openings 133 formed in the retractable portions 132. Accordingly, sealing can be conducted between each of the pair of detecting rod through holes 23A, 23B and corresponding one of the pair of detecting rods 80A, 80B which constitute a route through which water enters from the outside, and between the housing lid 20 and the housing body 30 by one detecting-rod sealing member 130 without influence of each detecting rod opening 133 on the each of the pair of detecting rods 80A, 80B projecting from/retracting into the pair of detecting rod through holes 23A, 23B of the housing lid 20. Thereby, the number of parts for sealing the housing 40 having a plurality of routes through which water enters from the outside can be reduced, so that reduction of the number of assembling steps and reduction of manufacturing cost can be achieved. Since the detecting-rod sealing member 130 is not interposed between the housing lid 20 and a portion of the housing body 30 where water may enter from the outside, the sealed structure of the housing can be reduced in size and reduction of the manufacturing cost can be achieved.

Since the respective retractable portions 132 cover the pair of detecting rods 80A, 80B, namely, the pair of detecting rods 80A, 80B are disposed in the hollow portions 132a of the respective retractable portions 132, even if the pair of detecting rods 80A, 80B move in the projecting/retracting directions P, the amounts of projection/retraction can be absorbed by the respective retractable portions 132. Accordingly, the respective detecting rod openings 133 of the detecting-rod sealing member 130 can be suppressed from moving from the positions of the outer peripheries of the pair of detecting rods 80A, 80B surrounded by the respective detecting rod openings 133. That is, the detecting rod openings 133 can be suppressed from sliding on the outer peripheries of the pair of detecting rods 80A, 80B in the projecting/retracting directions P of the detecting rods 80A, 80B. Water can be prevented from entering between each detecting rod opening 133 and corresponding one of the pair of detecting rods 80A, 80B by the sliding. Thereby, detection accuracy of the tilting angle of the main body fixed to the holder base 10 obtained by the detectors 90A, 90B can be prevented from lowering.

Since the respective detecting rod openings 133 cover the respective steps 80c of the pair of detecting rods 80A, 80B, the respective detecting rod openings 133 of the detecting-rod sealing member 130 can be restricted from moving beyond the respective steps 80c toward the housing 40. That is, since the respective detecting rod openings 133 are prevented from sliding beyond the respective steps 80c toward the housing 40, water can be prevented from entering between the respective detecting rod openings 133 and the pair of detecting rods 80A, 80B. Thereby, detection accuracy of the tilting angle of the main body fixed to the holder base 10 obtained by the detectors 90A, 90B can be prevented from lowering.

As shown in FIG. 17, the outer-mirror tilting apparatus 1 is mounted on the outer mirror base 200. At that time, as shown in FIG. 18, the positioning holes 39 of the housing body 30 of the housing 40 is inserted into the positioning protrusions 201 formed at predetermined portions of the outer mirror base 200. Thereby, the outer-mirror tilting apparatus 1 is positioned to the outer mirror base 200. Then, a screw (refer to FIG. 1) 150 which is a housing fixing member is screwed and inserted from the bearing unit opening 11a of the pivot shaft 11 of the holder base 10 to a housing communication hole constituted of the housing lid communication hole 21a of the housing lid 20 and the housing body communication hole 31 of the housing body 30. Thus, the housing lid 20 and the housing body 30 can be fixed by one fixing member.

A distal end of the screw 150 which has been protruded beyond the back face of the housing 40 is then screwed and inserted to a screw opening 202 formed in the outer mirror base 200. Thus, the outer-mirror tilting apparatus 1 is fixed to the outer mirror base 200. Accordingly, fixation of the outer-mirror tilting apparatus 1 to the outer mirror base 200 can securely be performed by one screw 150. Thereby, the number of parts for the outer mirror including the outer-mirror tilting apparatus 1 can be reduced, and reduction of the number of assembling steps or reduction of manufacturing cost can be achieved. Since the fixing member fixes the outer-mirror tilting apparatus 1 to the outer mirror base at a central portion of the outer-mirror tilting apparatus 1, the housing or the holder base can further be reduced in size, as compared with a conventional way of fixing at an outer periphery of the housing 40. Thereby, size reduction of the outer-mirror tilting apparatus 1 can be achieved. Further, since the screw 150 is screwed and inserted to the housing communication hole from the bearing unit opening 11a of the holder base 10, the outer-mirror tilting apparatus 1 can be simply and easily fixed to the outer mirror base 200 by the screw 150 after the pivot shaft 21 of the housing lid 20 of the housing 40 is fitted to the bearing unit 11 formed on the holder base 10.

Figure 9A:
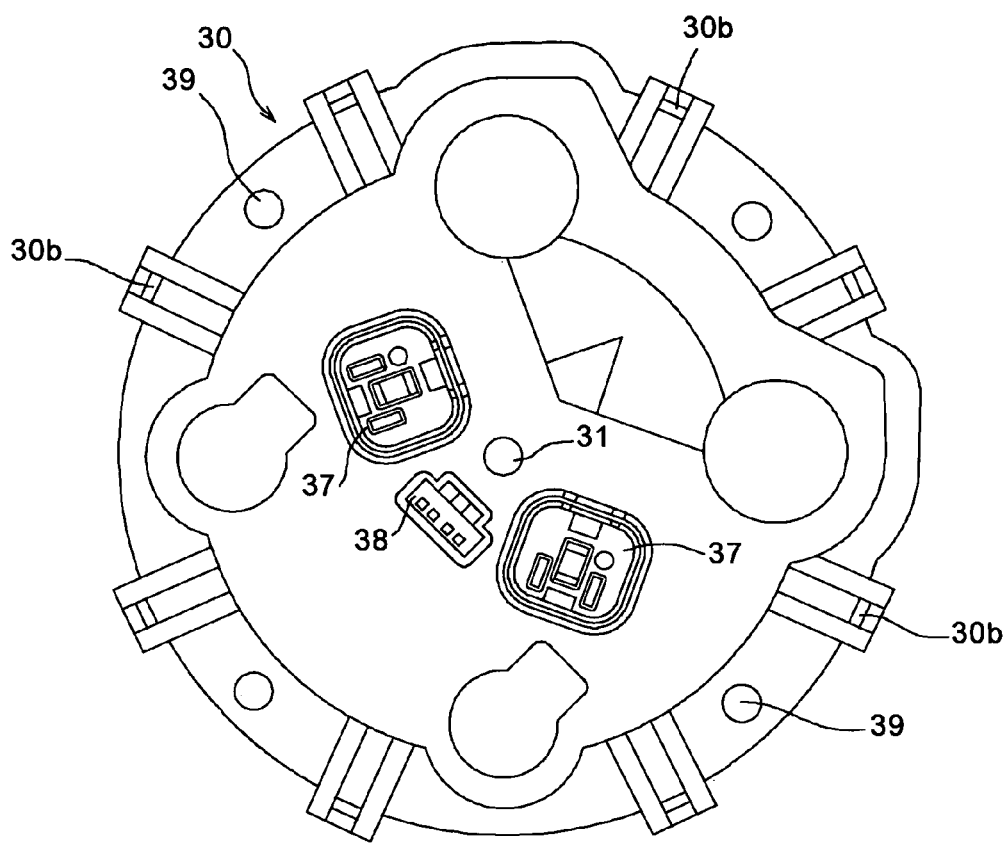
FIG. 9A is a rear view of the housing body.
Figure 9B:
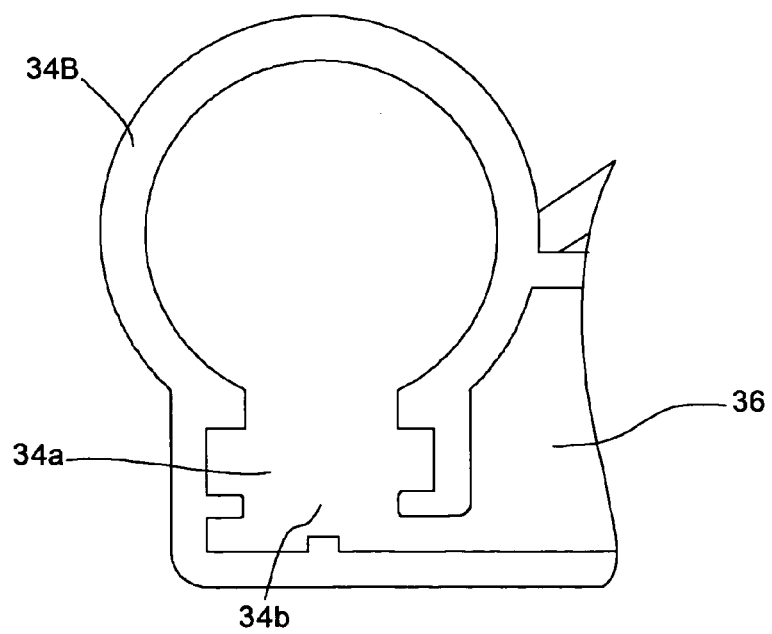
FIG. 9B is an enlargement of a portion indicated with a circle H in FIG. 8A.

Driving power source connectors, not shown, are respectively inserted into the respective driving power source connector receivers 37 of the housing body 30 (refer to FIG. 9A). The driving power source connectors supply driving power to the respective motors 64 of the driving units 60A, 60B from a battery mounted on a vehicle or the like via a tilting controller, not shown. As shown in FIG. 18, an external connector, not shown, is inserted into the external connector receiver 38 of the housing body 30, and a connecting terminal receiver, not shown, of the external connector and connecting terminals 96a to 96d of the detecting connector 95 of the detecting member 93 are connected to each other. At that time, since the detecting engagement member 25 of the housing lid 20 retains the detecting connector 95, the detecting member 93 as well as the detecting connector 95 can be restricted from moving in the projecting/retracting directions P of the pair of detecting rods 80A, 80B. That is, when the external connector is attached to/detached from the detecting connector 95 (the external connector receiver 38), the detecting member 93 provided with the detecting connector 95 can prevent the pair of detecting rods 80A, 80B from moving in the projecting/retracting directions P. Accordingly, the respective sliding members 91 provided on the pair of detecting rods 80A, 80B can be prevented from deviating from the respective resistors 92 provided on the detecting member 93. Thereby, the detection accuracy of the tilting angle of the main body fixed to the holder base 10 can be prevented from lowering. When the external connector is attached to/detached from the detecting connector 95, forces act on the detecting member 93 in the projecting/retracting directions P of the pair of detecting rods 80A, 80B, but since the detecting engagement member 25 retains the detecting connector 95, these forces can be prevented from acting on the detecting member 93. Thus, the detecting member 93 can be prevented from being damaged. Assembling of the outer-mirror tilting apparatus 1 is completed according to the above procedures.

An operation of the outer-mirror tilting apparatus 1 according to the present invention will be explained. A case that the holder base 10 is tilted to the housing 40 in left and right directions will be explained. Power is supplied to the motor 64 of the driving unit 60A via the tilting controller, not shown, to rotate the first gear 61 forwardly, so that the driving rod 50A screwed to the female screw 61c through the respective sliding clicks 50f moves in a direction of projecting from the housing 40 of the projecting/retracting directions P, namely toward the holder base 10. When the driving rod 50A moves in the direction of projecting from the housing 40, the holder base 10 whose driving socket 12A is fitted to the distal end 50b of the driving rod 50A is tilted about the pivot shaft 21 of the housing lid 20 in a direction (a leftward direction) of the directions of arrow Q in which a distance between the driving socket 12A of the holder base 10 and the housing 40 becomes wider than a distance between the detecting socket 13A and the housing 40. Thereby, the main body fixed to the holder base 10 is tilted to the left side to a traveling direction of the vehicle (refer to FIG. 19).

When the holder base 10 is tilted to the left side, the detecting rod 80A whose distal end 80b is fitted to the detecting socket 13A of the holder base 10 moves in a direction of retracting into the housing 40 of projecting/retracting directions P. When the detecting rod 80A moves in the direction of retracting into the housing 40, the detector 90A detects a projecting/retracting amount of the detecting rod 80A. That is, the sliding member 91 fixed to the detecting rod 80A slides on the resistor 92 provided on the detecting member 93 in the direction of retracting into the housing 40, so that a change in a detected voltage of a power source supplied from the external connector, not shown, for example, a voltage change to a plus side is detected. The change of the voltage is output to the tilting controller, not shown, via the detecting connector 95 and the external connector.

On the other hand, when the first gear 61 of the driving unit 60A is reverse rotated, the driving rod 50A moves in a direction of retracting into the housing 40 of the projecting/retracting directions P. When the driving rod 50A moves in the direction of retracting into the housing 40, the holder base 10 is tilted about the pivot shaft 21 of the housing lid 20 in a direction (a rightward direction) of the directions of arrow Q in which a distance between the driving socket 12A of the holder base 10 and the housing 40 is made narrower than a distance between the detecting socket 13A and the housing 40. Thereby, the main body fixed to the holder base 10 is tilted to the right side to the traveling direction of the vehicle (refer to FIG. 19). When the holder base 10 is tilted toward the right side, the detecting rod 80A moves in a direction projecting from the housing 40 of the projecting/retracting directions P, so that the sliding member 91 slides on the resistor 92 in the above direction, and a change of a detected voltage of the power source, for example, the voltage change to the minus side is detected. The change of the voltage is output to the tilting controller, not shown.

A case that the holder base 10 is titled in upward and downward directions to the housing 40 will be explained. When power is supplied to the motor 64 of the driving unit 60B via the tilting controller, not shown, to forwardly rotate the first gear 61, the driving rod 50B moves in a direction of projecting from the housing 40 of the projecting/retracting directions P. When the driving rod 50B moves in the projecting direction, the holder base 10 whose driving socket 12B is fitted to the distal end 50b of the driving rod 50B is tilted about the pivot shaft 21 of the housing lid 20 in a direction (a downward direction) of the directions of arrow Q in which a distance between the driving socket 12B of the holder base 10 and the housing 40 becomes wider than a distance between the detecting socket 13B and the housing 40. Thereby, the main body fixed to the holder base 10 is tilted downwardly to the traveling direction of the vehicle (refer to FIG. 19).

When the holder base 10 is tilted downwardly, the detecting rod 80B whose distal end 80b is fitted to the detecting socket 13B of the holder base 10 moves in a direction of retracting into the housing 40 of the projecting/retracting directions P. When the detecting rod 80B moves in the retracting direction, the detector 90B detects the projecting/retracting amount of the detecting rod 80B. That is, the sliding member 91 fixed to the detecting rod 80B slides on the resistor 92 provided on the detecting member 93 in the retracting direction, so that change of a detected voltage of a power supplied from the external connector, not shown, for example, the voltage change to the plus side is detected. The change of the voltage is output to the tilting controller, not shown, via the detecting connector 95 and the external connector.

On the other hand, when the first gear 61 of the driving unit 60B is reverse rotated, the driving rod 50B moves in a direction of retracting into the housing 40 of the projecting/retracting directions P. When the driving rod 50B moves in the retracting direction, the holder base 10 is tilted about the pivot shaft 21 of the housing lid 20 in a direction (an upward direction) of the directions of arrow Q in which a distance between the driving socket 12B of the holder base 10 and the housing 40 becomes narrower than a distance between the detecting socket 13B and the housing 40. Thereby, the main body fixed to the holder base 10 is tilted upwardly to the traveling direction of the vehicle (refer to FIG. 19). When the holder base 10 is tilted upwardly, the detecting rod 80B moves in a direction of projecting from the housing 40 of the projecting/retracting directions P, so that the sliding member 91 slides on the resistor 92 in the projecting direction, and change of a detected voltage of the power source, for example, the voltage changes to the minus side is detected. The change of the voltage is output to the tilting controller, not shown.

The case that the outer-mirror tilting apparatus 1 is mounted on the outer mirror on the left side is explained, but the outer-mirror tilting apparatus 1 may be constituted similarly or identically to the above to be mounted on an outer mirror on a right side. In that case, the outer mirror titling device may be mounted in a state that it is rotated by an angle of 90° from the state that the outer-mirror tilting apparatus is mounted on the outer mirror on the right side. The tilting controller, not shown, is constituted such that the holder base 10 is tilted by the rod driving mechanism 70 in an upward or downward direction and in a left or right direction based on the tilting angle of the holder base 10 in the upward or downward direction and in the left or right direction, which is stored in the tilting controller, the rod detecting mechanism 100 detects the stored tilting angle of the holder base 10 in the upward or downward direction and in the left or right direction, determination is made as to whether the detected tilting angle has reached the stored tilting angle, and the rod driving mechanism 70 is stopped based on the determination. However, the present invention is not limited to such a tilting controller, but such a configuration may be employed that the holder base 10 is titled by the rod driving mechanism 70 in an upward or downward direction and in a left or right direction based on any tilting angle in the upward or downward direction and in the left or right direction which is input from an input unit provided in interior of the vehicle by a driver riding on the vehicle.

As described above, since the outer-mirror tilting apparatus 1 according to the present invention is provided inside the housing 40 with the rod driving mechanism 70 and the rod detecting mechanism 100, the rod driving mechanism 70 that tilts the main body fixed to the holder base 10 and the rod detecting mechanism 100 can be integrated into a single unit. Thereby, the number of parts for the outer mirror that can detect the tilting angle of the main body can be reduced and the number of assembling steps or manufacturing cost can be reduced.

It is unnecessary to fix the rod detecting mechanism 100 to the outer mirror base 200 or the outer-mirror tilting apparatus 1 using a fixing member as a separate member like the conventional art, and the rod detecting mechanism 100 is also fixed to the outer mirror base 200 by fixing the outer-mirror tilting apparatus 1 to the outer mirror base 200 using one screw 150. Thus, reduction in number of assembling steps for the outer mirror that can detect the tilting angle of the main body or reduction in manufacturing cost can be achieved.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An outer-mirror tilting apparatus comprising:
   a holder base having a bearing unit at a central portion of a backface thereof;
   a housing that is fitted to the bearing unit, the housing having a pivot shaft engaging the bearing unit and supporting the holder base in a tiltable manner;
   a rod driving mechanism that includes:
      a pair of driving rods whose distal ends are fitted to a first driving socket and a second driving socket provided on the holder base to tilt the holder base in vertical direction and in horizontal direction, respectively; and
      a driving unit that projects/retracts each of the pair of driving rods from/into the housing;
   a rod detecting mechanism that includes:
      a pair of detecting rods disposed so as to be opposed to the pair of driving rods through the pivot shaft and project from/retract into the housing corresponding to tilting of the holder base in the vertical direction and in the horizontal direction, respectively; and
      a detector that detects the tilting angle of the holder base based on projecting/retracting amounts of the pair of detecting rods,
   wherein the holder base includes a pair of detecting sockets, and distal ends of the pair of detecting rods are respectively fitted to the pair of detecting sockets,
   wherein a pair of detecting rod guiding portions are formed inside the housing, each of the pair of detecting rods includes an engagement click extending toward and sliding on inner peripheral faces of the pair of detecting rod guiding portions in projecting/retracting directions of the pair of detecting rods, and the engagement click is biased in a diametrically outward direction of a corresponding detecting rod by a resilient member fixed to the inside of the detecting rod;
   a sliding member that is fixed to each of the pair of detecting rods; and wherein the detector includes a resistor that is accommodated in the housing and whose electrical output varies based on sliding of the sliding member in response to the projecting/retracting amounts of the pair of detecting rods from/into the housing,
   wherein the sliding member is fixed to a sliding member fixing portion formed on the engagement click and opposed to inner peripheral faces of the detecting rod guiding portions,
   the detecting rod guiding portions are formed with notches for allowing the sliding member to slide on the resistor, and
   a portion of the sliding member fixing portions makes a contact with an inner peripheral surface of the detecting rod guiding portions.

2. The outer-mirror tilting apparatus according to claim 1, wherein
   the notches are formed on extending portions formed in a diametrically outward direction of the detecting rod guiding portions, and
   the sliding member fixing portion with the sliding member is disposed on the extending portions.

* * * * *